(12) United States Patent
Yang et al.

(10) Patent No.: US 12,684,569 B2
(45) Date of Patent: Jul. 14, 2026

(54) SCHEDULING PROCEDURES FOR WIRELESS COMMUNICATION

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 437 days.

(21) Appl. No.: 18/501,938

(22) Filed: Nov. 3, 2023

(65) Prior Publication Data

US 2025/0151051 A1     May 8, 2025

(51) Int. Cl.
| | |
|---|---|
| *H04W 52/14* | (2009.01) |
| *H04L 5/00* | (2006.01) |
| *H04W 52/36* | (2009.01) |
| *H04W 72/1268* | (2023.01) |
| *H04W 72/541* | (2023.01) |

(52) U.S. Cl.
CPC ......... *H04W 72/1268* (2013.01); *H04L 5/001* (2013.01); *H04W 72/541* (2023.01)

(58) Field of Classification Search
CPC ...... H04B 7/088; H04B 7/0696; H04L 5/0053
See application file for complete search history.

(56) References Cited

U.S. PATENT DOCUMENTS

| | | | | |
|---|---|---|---|---|
| 10,263,657 | B2 * | 4/2019 | Niemi .................. | H04B 1/3838 |
| 2013/0211435 | A1 * | 8/2013 | Boukhny ............ | A61M 3/0216 |
| | | | | 606/169 |

(Continued)

FOREIGN PATENT DOCUMENTS

| | | |
|---|---|---|
| WO | WO-2023081602 A1 | 5/2023 |

OTHER PUBLICATIONS

International Search Report and Written Opinion—PCT/US2024/051287—ISA/EPO—Mar. 31, 2025 (2309579WO).

(Continued)

*Primary Examiner* — Christopher M Crutchfield
*Assistant Examiner* — Abusayeed M Haque
(74) *Attorney, Agent, or Firm* — Holland & Hart LLP

(57)     ABSTRACT

Methods, systems, and devices for wireless communications are described. The described techniques relate to various scheduling procedures for wireless communications. In some implementations, a user equipment (UE) may estimate transmission power used over a duration for tracking a specific absorption rate (SAR) and may indicate the estimated transmission power to a network. The network may schedule the UE based on the estimated transmission power. In some implementations, the UE may receive a control message that includes an uplink grant and an indication to skip monitoring of a physical downlink control channel (PDCCH) during a discontinuous reception cycle (DRX) on-duration. The UE may transmit a message to accept, partially accept, or reject the skipping of PDCCH monitoring. In some implementations, the UE may be configured for multiple user, multiple input, multiple output (MU-MIMO) communications with other UEs. The UE may receive a message that indicates parameters of the other UEs.

10 Claims, 15 Drawing Sheets

Estimate an amount of transmission power used over a duration associated with tracking a SAR, the amount of transmission power based on an average transmission power threshold over the duration — 1005

Transmit a control message that indicates the estimated amount of transmission power — 1010

Receive an uplink grant that schedules one or more data transmissions by the UE during the duration, where one or more transmission parameters associated with the one or more data transmissions is based on the estimated amount of transmission power — 1015

1000

(56) References Cited

U.S. PATENT DOCUMENTS

| | | | |
|---|---|---|---|
| 2016/0100413 A1 | 4/2016 | Hwang et al. | |
| 2020/0359330 A1 | 11/2020 | Zacharias et al. | |
| 2022/0312545 A1 | 9/2022 | Babaei | |
| 2023/0254781 A1* | 8/2023 | Sridharan ........... | H04W 52/367 |
| | | | 455/522 |

OTHER PUBLICATIONS

Samsung: "Discussion on Advanced Receiver Assumption and NWA Signaling for MU-MIMO", 3GPP TSG-RAN4 Meeting # 108bis, R4-2315883, 3rd Generation Partnership Project (3GPP), Mobile Competence Centre, 650, Route Des Lucioles, F-06921 Sophia-Antipolis Cedex, France, vol. RAN WG4, No. Xiamen, CN, Oct. 9, 2023-Oct. 13, 2023, Sep. 27, 2023, 6 Pages, XP052524312, sections 1, 2.2, 2.3.
Partial International Search Report—PCT/US2024/051287—ISA/EPO—Jan. 27, 2025 (2309579WO).

* cited by examiner 115-b 105-b

305    Capability Message

Configuration Message    310

315   Estimate Transmission Power

320    Control Message

Schedule UE Based On Traffic Conditions   325

Uplink Grant

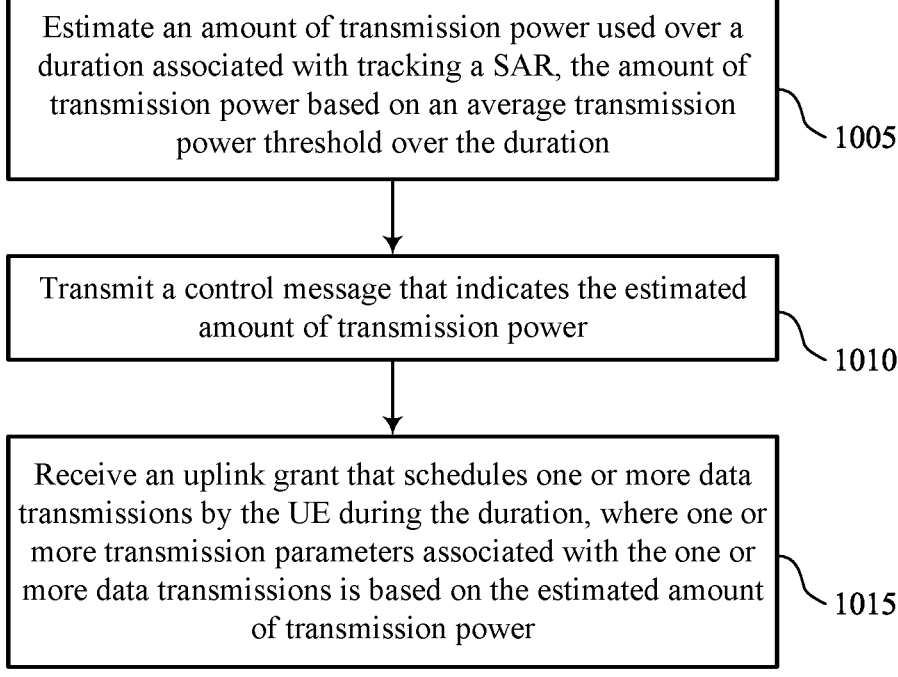

Estimate an amount of transmission power used over a duration associated with tracking a SAR, the amount of transmission power based on an average transmission power threshold over the duration — 1005

Transmit a control message that indicates the estimated amount of transmission power — 1010

Receive an uplink grant that schedules one or more data transmissions by the UE during the duration, where one or more transmission parameters associated with the one or more data transmissions is based on the estimated amount of transmission power — 1015

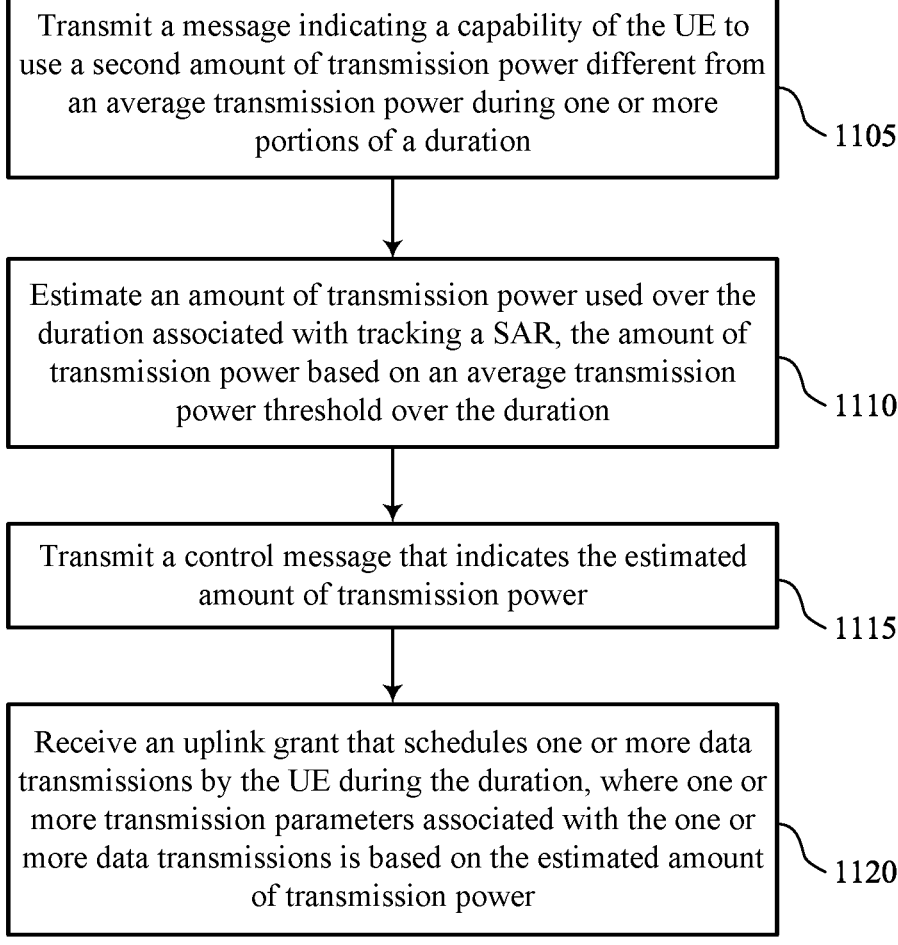

Transmit a message indicating a capability of the UE to use a second amount of transmission power different from an average transmission power during one or more portions of a duration

1105

Estimate an amount of transmission power used over the duration associated with tracking a SAR, the amount of transmission power based on an average transmission power threshold over the duration

1110

Transmit a control message that indicates the estimated amount of transmission power

1115

Receive an uplink grant that schedules one or more data transmissions by the UE during the duration, where one or more transmission parameters associated with the one or more data transmissions is based on the estimated amount of transmission power

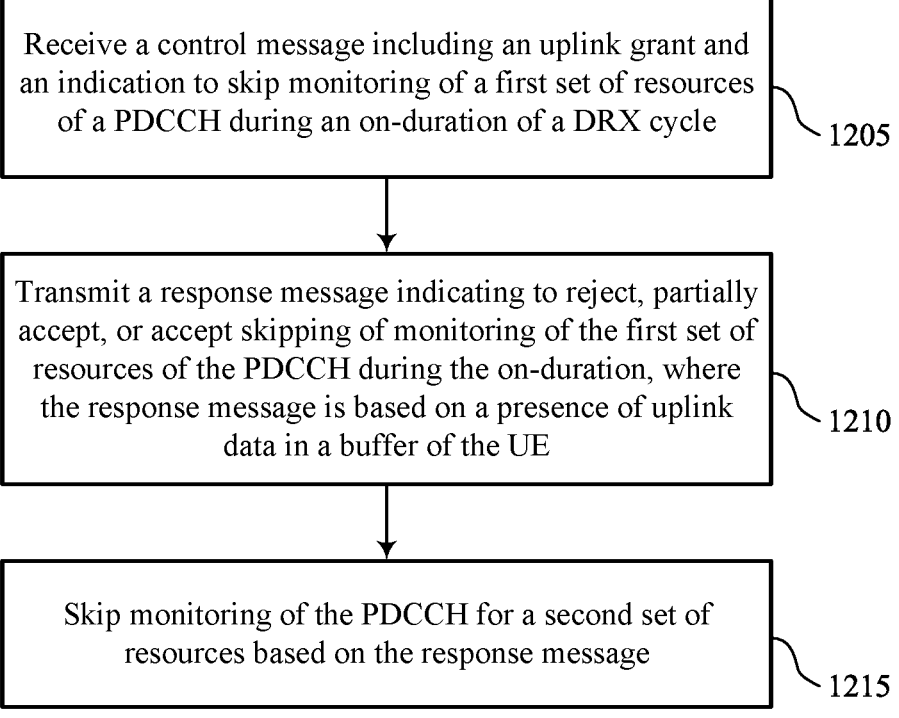

Receive a control message including an uplink grant and an indication to skip monitoring of a first set of resources of a PDCCH during an on-duration of a DRX cycle

1205

Transmit a response message indicating to reject, partially accept, or accept skipping of monitoring of the first set of resources of the PDCCH during the on-duration, where the response message is based on a presence of uplink data in a buffer of the UE

1210

Skip monitoring of the PDCCH for a second set of resources based on the response message

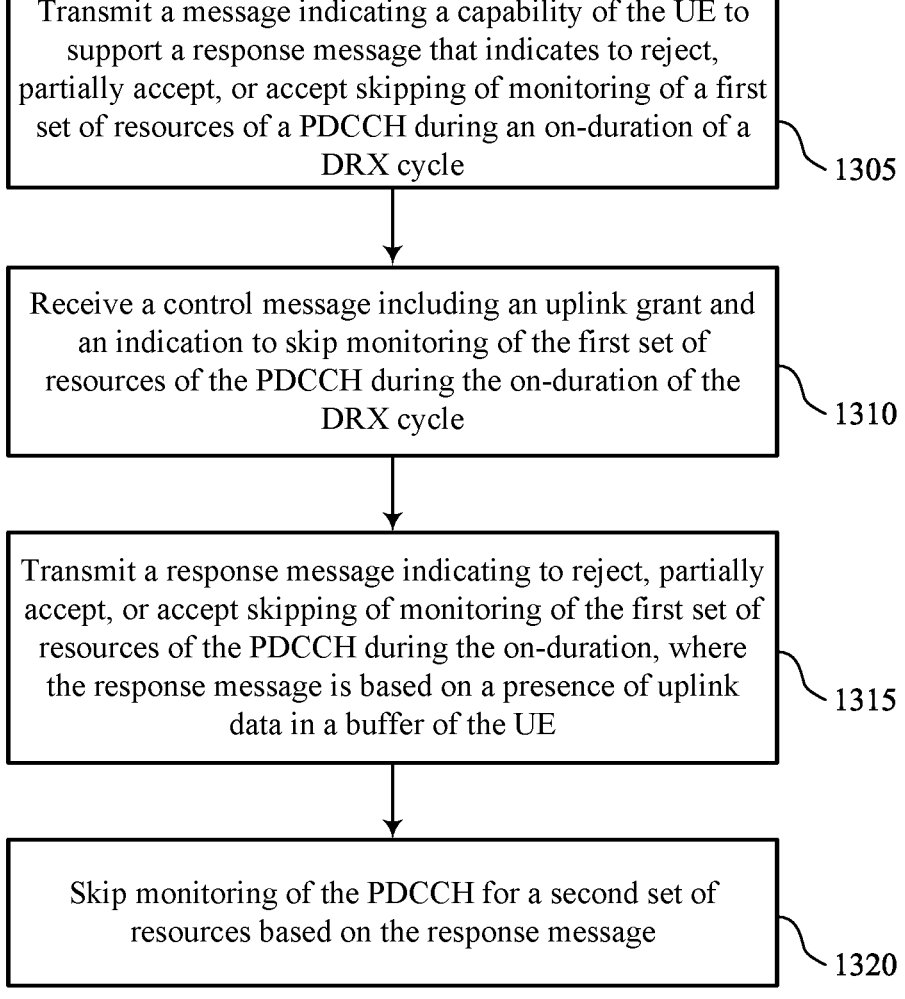

Transmit a message indicating a capability of the UE to support a response message that indicates to reject, partially accept, or accept skipping of monitoring of a first set of resources of a PDCCH during an on-duration of a DRX cycle

1305

Receive a control message including an uplink grant and an indication to skip monitoring of the first set of resources of the PDCCH during the on-duration of the DRX cycle

1310

Transmit a response message indicating to reject, partially accept, or accept skipping of monitoring of the first set of resources of the PDCCH during the on-duration, where the response message is based on a presence of uplink data in a buffer of the UE

1315

Skip monitoring of the PDCCH for a second set of resources based on the response message

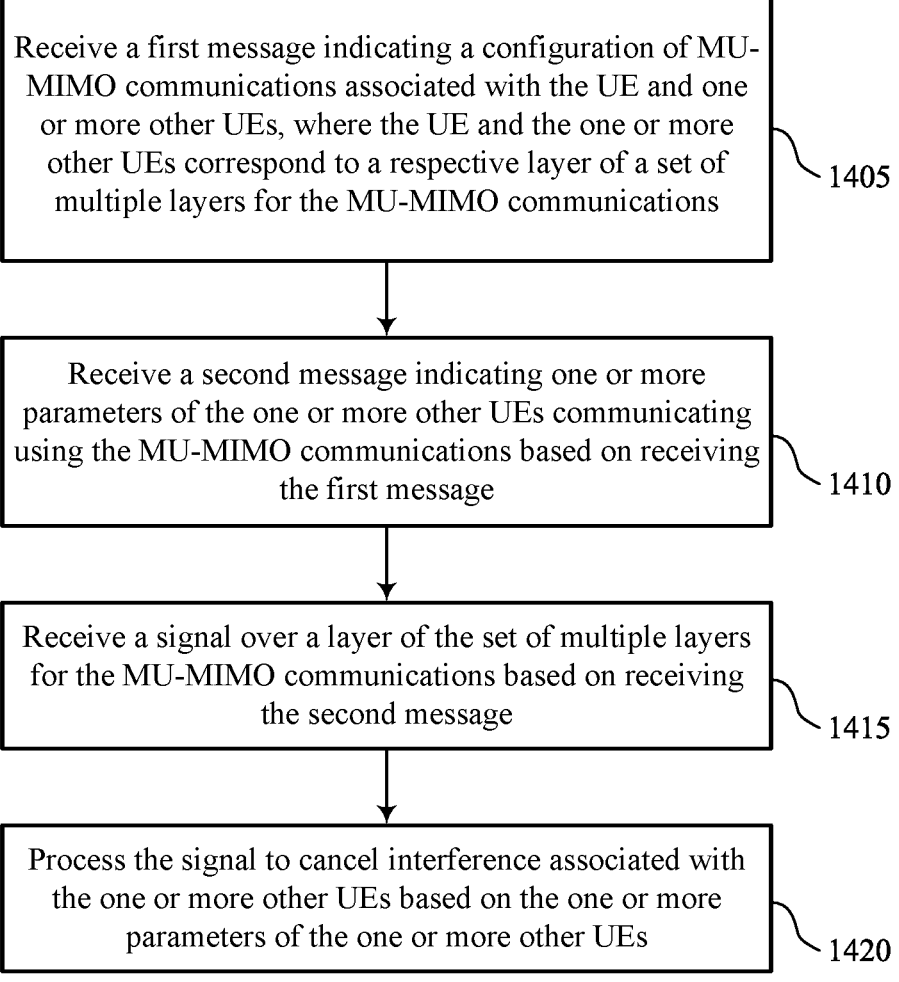

Receive a first message indicating a configuration of MU-MIMO communications associated with the UE and one or more other UEs, where the UE and the one or more other UEs correspond to a respective layer of a set of multiple layers for the MU-MIMO communications

1405

Receive a second message indicating one or more parameters of the one or more other UEs communicating using the MU-MIMO communications based on receiving the first message

1410

Receive a signal over a layer of the set of multiple layers for the MU-MIMO communications based on receiving the second message

1415

Process the signal to cancel interference associated with the one or more other UEs based on the one or more parameters of the one or more other UEs

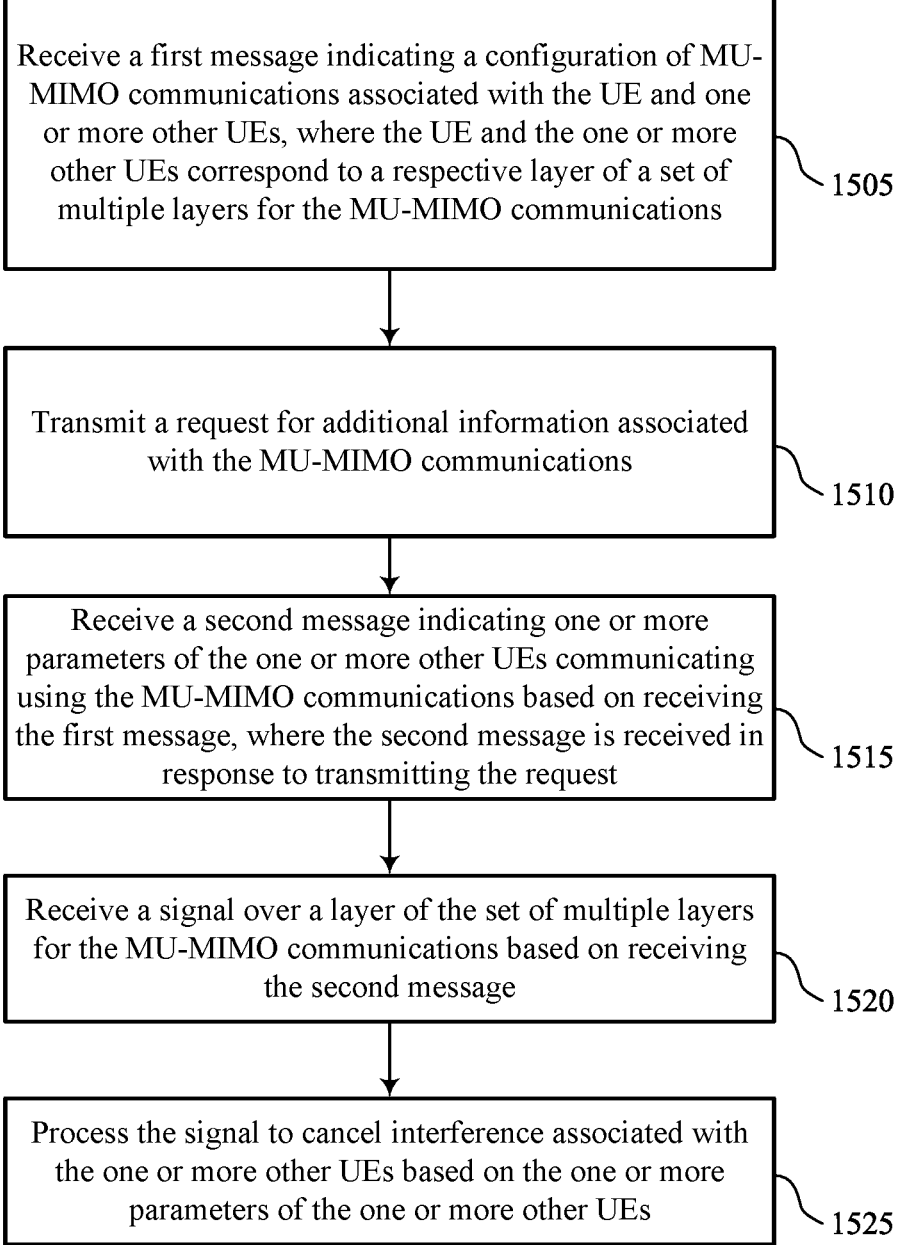

Receive a first message indicating a configuration of MU-MIMO communications associated with the UE and one or more other UEs, where the UE and the one or more other UEs correspond to a respective layer of a set of multiple layers for the MU-MIMO communications

1505

Transmit a request for additional information associated with the MU-MIMO communications

1510

Receive a second message indicating one or more parameters of the one or more other UEs communicating using the MU-MIMO communications based on receiving the first message, where the second message is received in response to transmitting the request

1515

Receive a signal over a layer of the set of multiple layers for the MU-MIMO communications based on receiving the second message

1520

Process the signal to cancel interference associated with the one or more other UEs based on the one or more parameters of the one or more other UEs

SCHEDULING PROCEDURES FOR WIRELESS COMMUNICATION

FIELD OF TECHNOLOGY

The following relates to wireless communications, including scheduling procedures for wireless communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support scheduling procedures for wireless communication. For example, the described techniques provide for signaling between a user equipment (UE) and a network entity to increase flexibility of transmission power utilization for a specific absorption rate (SAR) assessment period. The described techniques also provide for signaling between the UE and the network entity to support dynamic indication (e.g., accept, partially accept, reject) of skipping of a physical downlink control channel (PDCCH) during a discontinuous reception (DRX) cycle on-duration. The described techniques additionally support signaling between the UE and the network entity to support an indication of additional information of a multi-user, multiple input, multiple output (MU-MIMO) configuration to assist the UE in canceling interference.

A method for wireless communications by a UE is described. The method may include estimating an amount of transmission power used over a duration associated with tracking a SAR, the amount of transmission power based on an average transmission power threshold over the duration, transmitting a control message that indicates the estimated amount of transmission power, and receiving an uplink grant that schedules one or more data transmissions by the UE during the duration, where one or more transmission parameters associated with the one or more data transmissions is based on the estimated amount of transmission power.

A UE for wireless communications is described. The UE may include one or more memories storing processor executable code, and one or more processors coupled with the one or more memories. The one or more processors may individually or collectively operable to execute the code to cause the UE to estimate an amount of transmission power used over a duration associated with tracking a SAR, the amount of transmission power based on an average transmission power threshold over the duration, transmit a control message that indicates the estimated amount of transmission power, and receive an uplink grant that schedules one or more data transmissions by the UE during the duration, where one or more transmission parameters associated with the one or more data transmissions is based on the estimated amount of transmission power.

Another UE for wireless communications is described. The UE may include means for estimating an amount of transmission power used over a duration associated with tracking a SAR, the amount of transmission power based on an average transmission power threshold over the duration, means for transmitting a control message that indicates the estimated amount of transmission power, and means for receiving an uplink grant that schedules one or more data transmissions by the UE during the duration, where one or more transmission parameters associated with the one or more data transmissions is based on the estimated amount of transmission power.

A non-transitory computer-readable medium storing code for wireless communications is described. The code may include instructions executable by one or more processors to estimate an amount of transmission power used over a duration associated with tracking a SAR, the amount of transmission power based on an average transmission power threshold over the duration, transmit a control message that indicates the estimated amount of transmission power, and receive an uplink grant that schedules one or more data transmissions by the UE during the duration, where one or more transmission parameters associated with the one or more data transmissions is based on the estimated amount of transmission power.

Some examples of the method, UEs, and non-transitory computer-readable medium described herein may further include operations, features, means, or instructions for transmitting a message indicating a capability of the UE to use a second amount of transmission power different from an average transmission power during one or more portions of the duration.

Some examples of the method, UEs, and non-transitory computer-readable medium described herein may further include operations, features, means, or instructions for receiving, based on the message, a second message configuring the UE to use the second amount of transmission power during a portion of the one or more portions of the duration.

Some examples of the method, UEs, and non-transitory computer-readable medium described herein may further include operations, features, means, or instructions for skipping at least one data transmission of the one or more data transmissions based on the one or more transmission parameters satisfying a threshold associated with the duration.

Some examples of the method, UEs, and non-transitory computer-readable medium described herein may further include operations, features, means, or instructions for decreasing a transmission power of at least one data transmission of the one or more data transmissions based on the estimated amount of transmission power satisfying a threshold.

In some examples of the method, UEs, and non-transitory computer-readable medium described herein, the estimated amount of transmission power indicates a respective estimated amount of transmission power for each component carrier of a set of multiple component carriers associated with the one or more data transmissions.

In some examples of the method, UEs, and non-transitory computer-readable medium described herein, the uplink grant indicates a first transmission power corresponding to a first subset of component carriers of the set of multiple component carriers and a second transmission power corresponding to a second subset of component carriers of the set of multiple component carriers based on the respective amount of transmission power for each component carrier.

In some examples of the method, UEs, and non-transitory computer-readable medium described herein, the UE may be configured to transmit the one or more data transmissions via the first subset of component carriers during a first portion of the duration and transmit the one or more data transmissions via the second subset of component carriers during a second portion of the duration in accordance with an uplink transmission switching configuration.

In some examples of the method. UEs, and non-transitory computer-readable medium described herein, receiving the uplink grant may include operations, features, means, or instructions for receiving an indication to increase a value associated with at least one transmission parameter of the one or more transmission parameters based on the estimated amount of transmission power.

In some examples of the method, UEs, and non-transitory computer-readable medium described herein, the one or more transmission parameters include a physical resource block, a component carrier, a quantity of layers, a modulation and coding scheme, or a combination thereof.

A method for wireless communications by a UE is described. The method may include receiving a control message including an uplink grant and an indication to skip monitoring of a first set of resources of a PDCCH during an on-duration of a discontinuous reception cycle, transmitting a response message indicating to reject, partially accept, or accept skipping of monitoring of the first set of resources of the PDCCH during the on-duration, where the response message is based on a presence of uplink data in a buffer of the UE, and skipping monitoring of the PDCCH for a second set of resources based on the response message.

A UE for wireless communications is described. The UE may include one or more memories storing processor executable code, and one or more processors coupled with the one or more memories. The one or more processors may individually or collectively operable to execute the code to cause the UE to receive a control message including an uplink grant and an indication to skip monitoring of a first set of resources of a PDCCH during an on-duration of a discontinuous reception cycle, transmit a response message indicating to reject, partially accept, or accept skipping of monitoring of the first set of resources of the PDCCH during the on-duration, where the response message is based on a presence of uplink data in a buffer of the UE, and skip monitoring of the PDCCH for a second set of resources based on the response message.

Another UE for wireless communications is described. The UE may include means for receiving a control message including an uplink grant and an indication to skip monitoring of a first set of resources of a PDCCH during an on-duration of a discontinuous reception cycle, means for transmitting a response message indicating to reject, partially accept, or accept skipping of monitoring of the first set of resources of the PDCCH during the on-duration, where the response message is based on a presence of uplink data in a buffer of the UE, and means for skipping monitoring of the PDCCH for a second set of resources based on the response message.

A non-transitory computer-readable medium storing code for wireless communications is described. The code may include instructions executable by one or more processors to receive a control message including an uplink grant and an indication to skip monitoring of a first set of resources of a PDCCH during an on-duration of a discontinuous reception cycle, transmit a response message indicating to reject, partially accept, or accept skipping of monitoring of the first set of resources of the PDCCH during the on-duration, where the response message is based on a presence of uplink data in a buffer of the UE, and skip monitoring of the PDCCH for a second set of resources based on the response message.

Some examples of the method, UEs, and non-transitory computer-readable medium described herein may further include operations, features, means, or instructions for transmitting a message indicating a capability of the UE to support the response message that indicates to reject, partially accept, or accept skipping of monitoring of the first set of resources of the PDCCH during the on-duration.

Some examples of the method, UEs, and non-transitory computer-readable medium described herein may further include operations, features, means, or instructions for determining that the buffer of the UE may be empty, where the response message indicates to accept skipping of monitoring of the first set of resources, and where the second set of resources may be the same as the first set of resources based on the buffer being empty.

Some examples of the method, UEs, and non-transitory computer-readable medium described herein may further include operations, features, means, or instructions for predicting a reception of uplink data to the buffer during a time period, the time period overlapping with the first set of resources.

In some examples of the method, UEs, and non-transitory computer-readable medium described herein, the response message indicates to partially accept skipping of monitoring of the first set of resources and the second set of resources includes a subset of the first set of resources based on the prediction.

Some examples of the method, UEs, and non-transitory computer-readable medium described herein may further include operations, features, means, or instructions for predicting the reception of the uplink data to the buffer may be based on a machine learning model.

Some examples of the method, UEs, and non-transitory computer-readable medium described herein may further include operations, features, means, or instructions for determining that the buffer of the UE includes uplink data, where the response message indicates to reject skipping of monitoring of the first set of resources, and where the second set of resources may be non-overlapping with the first set of resources based on the buffer including the uplink data.

Some examples of the method, UEs, and non-transitory computer-readable medium described herein may further include operations, features, means, or instructions for monitoring the first set of resources of the PDCCH based on the response message indicating to reject skipping of monitoring of the first set of resources.

In some examples of the method, UEs, and non-transitory computer-readable medium described herein, transmitting the response message may include operations, features, means, or instructions for transmitting the response message via a medium access control control element (MAC-CE).

A method for wireless communications by a UE is described. The method may include receiving a first message indicating a configuration of MU-MIMO communications associated with the UE and one or more other UEs, where the UE and the one or more other UEs correspond to a respective layer of a set of multiple layers for the MU-MIMO communications, receiving a second message indicating one or more parameters of the one or more other UEs communicating using the MU-MIMO communications based on receiving the first message, receiving a signal over a layer of the set of multiple layers for the MU-MIMO communications based on receiving the second message, and processing the signal to cancel interference associated with the one or more other UEs based on the one or more parameters of the one or more other UEs.

A UE for wireless communications is described. The UE may include one or more memories storing processor executable code, and one or more processors coupled with the one or more memories. The one or more processors may individually or collectively operable to execute the code to cause the UE to receive a first message indicating a configuration of MU-MIMO communications associated with the UE and one or more other UEs, where the UE and the one or more other UEs correspond to a respective layer of a set of multiple layers for the MU-MIMO communications, receive a second message indicating one or more parameters of the one or more other UEs communicating using the MU-MIMO communications based on receiving the first message, receive a signal over a layer of the set of multiple layers for the MU-MIMO communications based on receiving the second message, and process the signal to cancel interference associated with the one or more other UEs based on the one or more parameters of the one or more other UEs.

Another UE for wireless communications is described. The UE may include means for receiving a first message indicating a configuration of MU-MIMO communications associated with the UE and one or more other UEs, where the UE and the one or more other UEs correspond to a respective layer of a set of multiple layers for the MU-MIMO communications, means for receiving a second message indicating one or more parameters of the one or more other UEs communicating using the MU-MIMO communications based on receiving the first message, means for receiving a signal over a layer of the set of multiple layers for the MU-MIMO communications based on receiving the second message, and means for processing the signal to cancel interference associated with the one or more other UEs based on the one or more parameters of the one or more other UEs.

A non-transitory computer-readable medium storing code for wireless communications is described. The code may include instructions executable by one or more processors to receive a first message indicating a configuration of MU-MIMO communications associated with the UE and one or more other UEs, where the UE and the one or more other UEs correspond to a respective layer of a set of multiple layers for the MU-MIMO communications, receive a second message indicating one or more parameters of the one or more other UEs communicating using the MU-MIMO communications based on receiving the first message, receive a signal over a layer of the set of multiple layers for the MU-MIMO communications based on receiving the second message, and process the signal to cancel interference associated with the one or more other UEs based on the one or more parameters of the one or more other UEs.

Some examples of the method, UEs, and non-transitory computer-readable medium described herein may further include operations, features, means, or instructions for transmitting a request for additional information associated with the MU-MIMO communications, where the second message may be received in response to transmitting the request.

In some examples of the method, UEs, and non-transitory computer-readable medium described herein, the one or more parameters include a maximum number of layers for the MU-MIMO communications, a quantity of the one or more other UEs, or both.

In some examples of the method, UEs, and non-transitory computer-readable medium described herein, the one or more parameters include a spatial correlation between the UE and a subset of the one or more other UEs, a respective scrambling identifier corresponding to each UE of the subset of the one or more other UEs, or both.

In some examples of the method, UEs, and non-transitory computer-readable medium described herein, receiving the signal may include operations, features, means, or instructions for receiving at least one of a data message or a demodulation reference signal in accordance with a scrambling identifier corresponding to the UE.

Some examples of the method, UEs, and non-transitory computer-readable medium described herein may further include operations, features, means, or instructions for receiving the second message may be based on a spatial separation between the UE and at least one UE of the one or more other UEs satisfying a threshold.

Some examples of the method, UEs, and non-transitory computer-readable medium described herein may further include operations, features, means, or instructions for receiving a third message indicating a second configuration of single-user, multiple input, multiple output (SU-MIMO) communications associated with the UE, where the UE corresponds to a second set of multiple layers for the SU-MIMO communications, receiving a second signal over a second layer of the second set of multiple layers for the SU-MIMO communications based on receiving the third message, and processing the second signal to cancel second interference associated with one or more layers of the second set of multiple layers different from the second layer.

In some examples of the method, UEs, and non-transitory computer-readable medium described herein, the second set of multiple layers may be greater than the first set of multiple layers.

In some examples of the method, UEs, and non-transitory computer-readable medium described herein, the set of multiple layers for the MU-MIMO communications correspond to a same time slot of a physical resource block.

BRIEF DESCRIPTION OF THE DRAWINGS

FIGS. 10 through 15 show flowcharts illustrating methods that support scheduling procedures for wireless communication in accordance with one or more aspects of the present disclosure.

DETAILED DESCRIPTION

Figure 1:
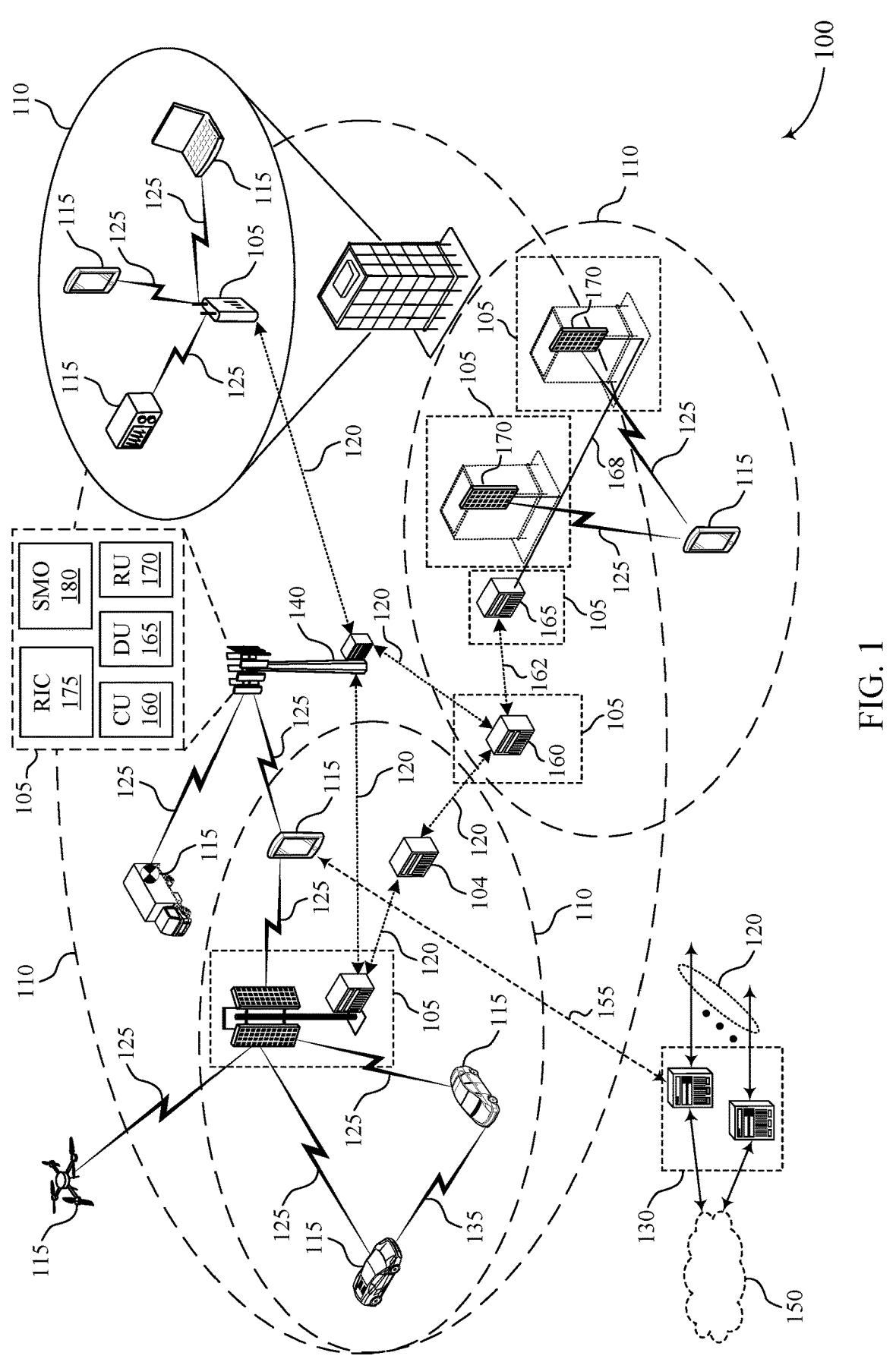
FIG. 1 shows an example of a wireless communications system that supports scheduling procedures for wireless communication in accordance with one or more aspects of the present disclosure.

Various aspects generally relate to scheduling procedures for wireless communication, and more specifically to transmission power coordination for uplink data transmission, adaptive skipping of physical downlink control channel (PDCCH) monitoring, and multiple user, multiple input, multiple output (MU-MIMO) configurations.

In some wireless communications systems, transmission power used by a user equipment (UE) may be limited by specific absorption rate (SAR) requirements. SAR may refer to measurements of a rate of radio frequency energy absorption by a body from a source of radio frequency transmissions (e.g., an amount of radiation absorbed by a user of a UE from the UE). SAR requirements may refer to rules and regulations that relate to safety guidelines set forth by various rule setting bodies. For example, the UE may limit transmission power to not exceed an average transmission power threshold over a duration associated with a SAR assessment (e.g., a SAR assessment duration). However, the UE may not use any transmission power (or may use a below average transmission power) during some periods of the SAR assessment duration, which may lead to a leftover transmission power during the SAR assessment duration. However, the leftover transmission power may go unused, reducing efficiency of power utilization, or the UE may report a power headroom report that does not account for the leftover transmission power, which may cause a network to refrain from scheduling the UE resulting in a reduction in throughput.

In accordance with examples described herein, a UE and a network entity may exchange signaling indicating transmission power related to a SAR duration to support dynamic scheduling of the UE. The UE may indicate to the network entity an amount of transmission power that is available in some periods (e.g., portions) of the SAR assessment duration. In other examples, the UE may indicate to the network entity that transmission power should be reduced for the periods of the SAR assessment duration. The network entity may increase or decrease transmission power (e.g., via one or more transmission parameters of an uplink grant) for at least one uplink transmission at the UE based on the UE indication. For example, the network entity may increase or decrease, for the at least one uplink transmission, a physical resource block, a quantity of component carriers, a quantity of layers, or a modulation and coding scheme, among other transmission parameters, based at least in part on an indication from the UE of an amount of available power during different periods of the SAR assessment duration.

In some wireless communications systems, a network entity may indicate for a UE to skip monitoring of a PDCCH for some time slots of an on-duration of a discontinuous reception (DRX) cycle. In some examples, however, data may arrive into a UE buffer just before the skipping occasion, or the UE may predict that data will enter the UE buffer during a time period (e.g., in the near future, overlapping with the time slots), and it may be beneficial for the UE to continue to monitor the PDCCH despite the indication from the network entity to skip monitoring. However, in some cases the UE may be required to skip monitoring for the slots indicated by the network entity, and the UE may suffer from increased latency and degradation of user experience due to skipping monitoring of the PDCCH while data is present in the UE buffer.

In accordance with examples described herein, a UE may accept or reject PDCCH skipping that is indicated by a network entity. The network entity may indicate, via a downlink control information (DCI) message, a message that includes an uplink grant and a set of resources (e.g., slots) to skip monitoring of the PDCCH. The UE may accept to skip a portion of the slots indicated by the network, may accept to skip the slots indicated by the network, or may reject skipping the slots indicated by the network and may instead propose different slots for the UE to skip PDCCH monitoring (e.g., based on a prediction of the UE of when the UE buffer will be empty).

In some wireless communications systems, a user equipment may be configured for MU-MIMO communications with one or more other UEs. Each of the UEs of the MU-MIMO configuration may correspond to a respective layer of a set of layers, and the set of layers may occur in a time slot of a physical resource block. The UE may lack information about the MU-MIMO configuration. For example, the UE may be unaware of information about the MU-MIMO configuration with respect to the other UEs, which may prevent the UE from performing accurate inter-UE (e.g., inter-layer) interference cancelation on signals that the UE receives.

In accordance with examples described herein, a network entity may transmit, to a UE, an indication of additional information about the MU-MIMO communications. For example, the network entity may indicate to the UE parameters of the other UEs that are configured for the MU-MIMO communications with the UE and that each correspond to one or more layers of the set of layers for the MU-MIMO communications. For example, the network entity may indicate a maximum number of layers for the MU-MIMO communications, a quantity of the other UEs, a spatial correlation between the UE and the other UEs, scrambling identifiers corresponding to each of the other UEs, or a combination thereof. Based on the parameters received from the network entity, the UE may perform an inter-UE interference cancelation of a signal received from the network entity to reduce interference associated with the other UEs.

Aspects of the disclosure are initially described in the context of wireless communications systems. Aspects of the disclosure are further described in the context of wireless communications systems and process flows. Aspects of the disclosure are further illustrated by and described with reference to apparatus diagrams, system diagrams, and flowcharts that relate to scheduling procedures for wireless communication.

FIG. 1 shows an example of a wireless communications system 100 that supports scheduling procedures for wireless communication in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more Dus 165 or Rus 170, and the one or more Dus 165 or Rus 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more Rus 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more Dus 165 via a midhaul communication link 162 (e.g., F1, F1-c, F1-u), and a DU 165 may be connected to one or more Rus 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more Dus 165 or one or more Rus 170 may be partially controlled by one or more Cus 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by Dus 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include Dus 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support scheduling procedures for wireless communication as described herein. For example, some operations described as being performed by a UE 115 or a network entity 105 (e.g., a base station 140) may additionally, or alternatively, be performed by one or more components of the disaggregated RAN architecture (e.g., IAB nodes 104, Dus 165, Cus 160, Rus 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, Rus 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and MU-MIMO, for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, a UE 115 may estimate an amount of transmission power used over a duration. The duration may be associated with tracking a SAR, and the amount of transmission power may be based on an average transmission power threshold over the duration. The UE 115 may transmit, to a network entity 105, a control message that indicates the estimated amount of transmission power. The UE 115 may receive, from the network entity 105, an uplink grant that schedules one or more data transmissions by the UE during the duration. One or more transmission parameters associated with the one or more data transmissions may be based on the estimated amount of transmission power.

In some examples, a UE 115 may receive a control message indicating an uplink grant and an indication to skip monitoring of a first set of resources of a PDCCH during an on-duration of a DRX cycle. The UE 115 may transmit a response message indicating to reject, partially accept, or accept skipping of monitoring of the first set of resources of the PDCCH during the on-duration. The response message may be based on a presence of uplink data in a buffer of the UE 115. The UE 115 may skip monitoring of the PDCCH for a second set of resources based on the response message.

In some examples, a UE may receive a first message indicating a configuration of MU-MIMO communications associated with the UE 115 and one or more other UEs 115. The UE and the one or more other UEs may correspond to a respective layer of a set of layers for the MU-MIMO communications. The UE 115 may receive a second message indicating one or more parameters of the one or more other UEs 115 communicating using the MU-MIMO communications based on receiving the first message. The UE 115 may receive a signal over a layer of the set of layers for the MU-MIMO communications based on receiving the second message and may process the signal to cancel interference associated with the one or more other UEs 115 based on the one or more parameters of the one or more other UEs 115.

Figure 2:
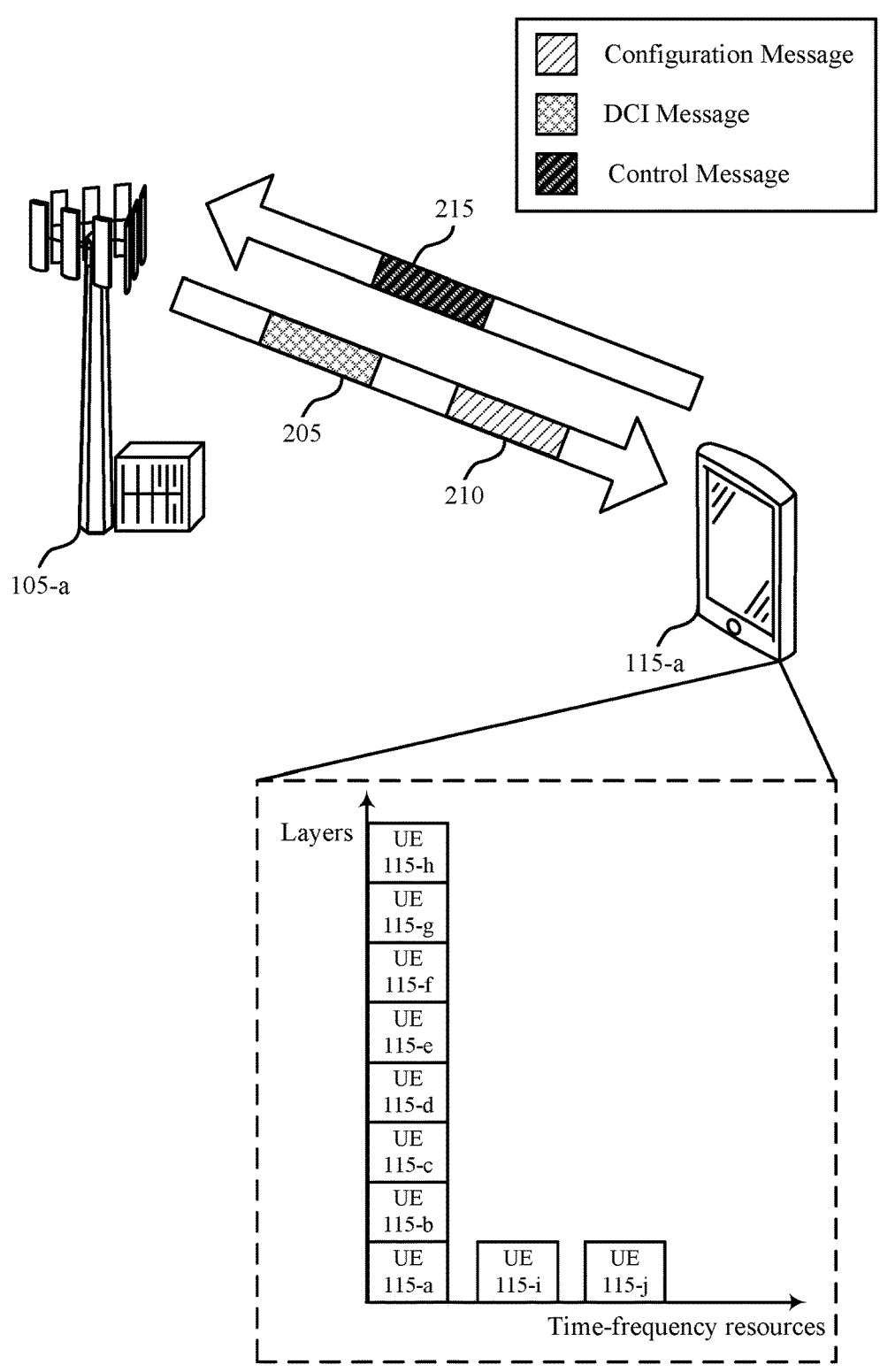
FIG. 2 shows an example of a wireless communications system that supports scheduling procedures for wireless communication in accordance with one or more aspects of the present disclosure.

FIG. 2 shows an example of a wireless communications system 200 that supports scheduling procedures for wireless communication in accordance with one or more aspects of the present disclosure. The wireless communications system 200 may implement, or may be implemented by, aspects of the wireless communications system 100 or the wireless communications system 100. For example, the wireless communications system 200 may include a UE 115-*a* and a network entity 105-*a*, which may be examples of corresponding devices as described herein.

The UE 115-*a* may support uplink carrier aggregation. That is, the UE 115-*a* may transmit to the network entity 105-*a* via multiple uplink component carriers. However, the UE 115-*a* may be limited by an amount of transmit power that is available at the UE 115-*a*. For example, in a large portion of a cell coverage area, the UE 115-*a* may be unable to efficiently use more than a fraction of the bandwidth of a single carrier (e.g., uplink component carrier). Thus, the UE 115-*a* may lack sufficient transmit power to utilize uplink carrier aggregation and may refrain from aggregating more than one component carrier due to a transmit power constraint.

A first example of techniques to improve signaling may include adaptively using transmission power related to SAR requirements. To support human body safety, an energy generated by the 115-*a* transmitting signals may satisfy corresponding SAR requirements (e.g., thresholds). SAR may refer to measurements of a rate of radio frequency energy absorbed by a body (e.g., a body of a user) from a source of radio frequency transmissions (e.g., an amount of radiation absorbed by a user of a UE from the UE). SAR requirements may refer to rules and regulations that relate to safety guidelines set forth by various rule setting bodies about how much radio frequency energy is absorbed over a duration (e.g., a SAR assessment duration). In some examples, to satisfy threshold thresholds for SAR in a given duration, a UE may limit transmit power during a portion of the duration. In some examples, the UE 115-*a* may reduce a transmit power by some amount such that the transmit power by the UE satisfies (e.g., complies with) the SAR requirements. The SAR requirements may apply to a duration (e.g., a SAR assessment period) of wireless communications at the UE 115-*a*, and the SAR requirements may include a threshold average transmission power (e.g., a maximum average transmission power) over the duration.

In some examples, the UE 115-*a* may monitor or control transmission power by the UE 115-*a* for one or more portions of the duration (e.g., per duty cycle, one or more sub-periods of the duration) such that an average transmission power by the UE 115-*a* over the duration satisfies (e.g., does not exceed) the threshold average transmission power. For example, the UE 115-*a* may utilize duty cycle control to maintain SAR compliance such that an average transmission power does not exceed a maximum transmission power indicated by the SAR requirements. In some portions of the duration (e.g., in a first duty cycle, a first sub-period), the UE 115-*a* may use more transmission power than the threshold average transmission power, while in some other portions of the duration (e.g., in a second duty cycle, a second sub-period), the UE 115-*a* may use less transmission power than the threshold average transmission power.

As such, there may be a backup transmission power (e.g., a leftover transmission power) for one or more portions of the duration (e.g., for each duty cycle). The backup transmission power for a portion of the duration may be a difference (e.g., delta) between the threshold average transmission power and the actual amount of transmission power that the UE 115-*a* uses during that portion of the duration. The backup transmission power may be positive or negative. A positive backup transmission power may indicate that the actual amount of transmission power used by the UE 115-*a* during the portion of the duration is less than the threshold average transmission power. A negative backup transmission power may indicate that the actual amount of transmission power used by the UE 115-*a* during the portion of the duration is greater than the threshold average transmission power.

In some examples, the UE 115-*a* may transmit a power headroom report to the network entity 105-*a* indicating an amount of transmission power available to the UE 115-*a*. The power headroom report may include information about the power headroom relative to various thresholds associated with SAR requirements, in addition to other metrics of power headroom. The UE 115-*a* may indicate, via the power headroom report, that the UE 115-*a* lacks sufficient transmission power to perform one or more wireless communications operations. That is, the UE 115-*a* may transmit a power headroom limitation. However, the power headroom limitation may fail to take into account a positive backup transmission power that may be available to the UE 115-*a*. In some examples, a positive backup transmission power (relative to SAR requirements) may go unused due to a lack of coordination between the UE 115-*a* and the network entity 105-*a* on when or how to use the backup transmission power.

In accordance with examples described herein, the UE 115-*a* may indicate, to the network entity 105-*a* via a control message 215, the backup transmission power that is available to the UE 115-*a* during one or more portions of the duration (e.g., SAR assessment period). The network entity 105-*a* may schedule the UE 115-*a*, via a DCI message 205, with one or more data transmissions that are based on the indication from the UE 115-*a*. In some examples, a positive backup transmission power may indicate to the UE 115-*a* or to the network entity 105-*a* that additional transmission power is available to be used at one or more other portions of the duration. Accordingly, the UE 115-*a* or the network entity 105-*a* may allocate a relatively larger amount of transmission power to transmissions (e.g., data transmissions) during the one or more other portions. For example, the network entity 105-*a* may schedule, via an uplink grant, data transmissions with a relatively larger (e.g., the network entity 105-*a* may indicate to increase) physical resource block, quantity of component carriers, quantity of layers (e.g., MIMO layers), modulation and coding scheme, or a combination thereof.

In other examples, a negative backup transmission power may indicate to the UE 115-*a* or to the network entity 105-*a* that transmission power is to be reduced at the one or more other portions of the duration. In such examples, the UE 115-*a* or the network entity 105-*a* may allocate a relatively smaller amount of transmission power to one or more transmissions during the one or more other portions. For example, the network entity 105-*a* may schedule, via an uplink grant, at least one data transmission with a relatively smaller (e.g., the network entity 105-*a* may indicate to decrease) physical resource block, quantity of component carriers, quantity of layers (e.g., MIMO layers), modulation and coding scheme, or a combination thereof, relative to other data transmissions that the network entity 105-*a* schedules. In some examples, the UE 115-*a* may reduce its transmission power for the at least one data transmission (relative to the amount of transmission power indicated by the network entity 105-*a*) to satisfy SAR requirements for the SAR assessment period.

A second example of techniques to improve signaling may include adaptive skipping of monitoring as part of a DRX on-duration. The UE 115-*a* may be a connected-mode UE, and the network entity may configure the UE 115-*a*, via a configuration message 210, with a DRX cycle to support power savings at the UE 115-*a* (e.g., by enabling the UE 115-*a* to enter a low power mode). For example, the UE 115-*a* may cycle between a DRX active period (e.g., an on-duration in the DRX cycle) and a DRX inactive period (e.g., an off-duration in the DRX cycle). As part of the DRX active period the UE 115-*a* may monitor one or more downlink channels for transmissions from the network entity 105-*a* for an on-duration. As part of the DRX inactive period the UE 115-*a* may sleep, enter a low power mode, or refrain from monitoring one or more downlink channels, for an off-duration. In some examples, the network entity 105-*a* may indicate, via the DCI message 205, PDCCH monitoring skipping, which may allow the UE 115-*a* to refrain from (e.g., skip, stop, pause) monitoring the PDCCH for a period of time within the DRX active time.

In some examples, the network entity 105-*a* may configure the UE 115-*a*, via the configuration message 210, with search space set group switching, which may allow the network entity 105-*a* to adapt a PDCCH monitoring periodicity of the UE 115-a. For example, the network entity 105-a may configure the UE 115-a, via the configuration message 210, with a quantity of search space set groups (e.g., up to 3 search space set groups), each having a respective PDCCH monitoring occasion periodicity, and the network entity 105-a may indicate, via the DCI message 205, for the UE 115-a to switch between the search space set groups based on traffic activity.

A lack of coordination between the UE 115-a and the network entity 105-a regarding skipping PDCCH monitoring (e.g., when to skip PDCCH monitoring) may result in various inefficiencies. For example, the UE 115-a may not have an opportunity to reject the indication from the network entity 105-a to skip PDCCH monitoring. The UE 115-a may determine that uplink data has just arrived at a buffer of the UE 115-a and that the UE would benefit from monitoring the PDCCH (e.g., to receive scheduling for the uplink data). However, the UE may skip monitoring of the PDCCH based on the indication from the network entity 105-a, which may increase latency and degrade user experience. In some examples, the UE 115-a may be aware of an application quality of service (QOS) or the UE 115-a may make traffic predictions (e.g., using artificial intelligence, machine learning, or both). However, the UE 115-a may be unable to propose a quantity of slots (e.g., a duration) to skip monitoring of the PDCCH based on the app QoS or the traffic predictions.

In some examples (e.g., when RF conditions are below a threshold), the UE 115-a may fail to receive the indication from the network entity 105-a to skip PDCCH monitoring (e.g., may fail to receive the DCI message 205), which may cause a mismatch (e.g., inconsistency) between the UE 115-a and the network entity 105-a regarding when to start skipping PDCCH monitoring. In other examples, failure by the UE 115-a to receive the DCI message 205 may result in a mismatch between the UE 115-a and the network entity 105-a regarding on (e.g., active) and off (e.g., inactive) periods of a continuous mode DRX (C-DRX), which may cause degraded user experience.

In accordance with examples described herein, the UE 115-a may, via the control message 215, accept or reject the indication from the network entity 105-a to skip PDCCH monitoring. The network entity may transmit the DCI message 205, which may include an uplink grant, scheduling the UE 115-a with one or more data transmissions, and one or more bits (e.g., skipping bits) that indicate one or more slots (e.g., sets of resources, time resources) to skip monitoring of the PDCCH. The UE 115-a may accept to skip monitoring of a portion of the slots indicated by the network (e.g., a partial accept), may accept to skip monitoring of the slots indicated by the network, or may reject skipping of monitoring of the slots indicated by the network. In cases where the UE 115-a rejects the indication from the network entity 105-a to skip PDCCH monitoring, the UE 115-a may propose different slots (e.g., a different duration, a different starting slot) for the UE to skip PDCCH monitoring (e.g., based on a prediction of the UE of when the UE buffer will be empty, based on app QoS), or may transmit a buffer status report to the network entity 105-a.

A third example of techniques to improve signaling may include enhancements for MU-MIMO interference cancellation. In some examples, the network entity 105-a may configure the UE 115-a, via the configuration message 210, for MU-MIMO communications with one or more other UEs 115. The UE 115-a may be paired with the UE 115-b, the UE 115-c, the UE 115-d, the UE 115-e, the UE 115-f, the UE 115-g, and the UE 115-h, and each of the UEs 115 may communicate with the network entity 105-a via a respective MIMO layer. The network entity 105-a may schedule the multiple UEs 115 in a same slot with an overlapped physical resource block.

In some examples, pairing of the UEs 115 may be based on a pairing algorithm, which may assign an adaptive pairing layer number to each of the UEs 115 to increase spectral efficiency. The paring of the UEs 115 using the pairing algorithm may be based on a signal to interference plus noise ratio (SINR), a beam, a channel quality indicator, a load, a buffer, a buffer status report, or a combination thereof, of the UE 115-a or the one or more other UEs 115. For example, the network entity may pair UEs belonging to different beams with a low spatial correlation, may pair UEs such that a channel quality indicator of the paired UEs exceeds a threshold, may pair UEs such that a sounding reference signal (SRS) SINR of the paired UEs exceeds a threshold, may pair the UEs such that a physical resource block usage exceeds a threshold, or a combination thereof. The UE 115-i and the UE 115-j may be unpaired (e.g., may not be paired with any other UE 115).

The configuration message 210 may configure the UE 115-a with a non-orthogonal MU-MIMO configuration or an orthogonal MU-MIMO configuration. For non-orthogonal MU-MIMO, the different UEs 115 may use the same demodulation reference signal (DMRS) port. The number of layers per UE for SU-MIMO (e.g., up to 4 layers) may be the same as the number of layers per UE for MU-MIMO. There may be a total maximum number of layers for MU-MIMO (e.g., across the UEs 115), which may be, for example, 16 or more layers with a single front demodulation reference signal of Type 1. For orthogonal MU-MIMO, the different UEs 115 may use different DMRS ports. The number of layers per UE for SU-MIMO (e.g., up to 4 layers) may be the same or different from the number of layers per UE for MU-MIMO (e.g., up to 2 or 4 layers). There may be a total maximum number of layers for MU-MIMO (e.g., across the UEs 115), which may be, for example, 8 or more layers with a single front demodulation reference signal of Type 1.

In some examples, a quantity of layers for MU-MIMO is less than a quantity of layers for SU-MIMO. However, the UE 115-a may send a SRS or report CSI based on the quantity of layers for SU-MIMO because the quantity of layers for MU-MIMO may be unknown to the UE 115-a, which may result in interference, data losses, or other inefficiencies. In some examples, for example in cases where the different UEs 115 may use the same DMRS port (e.g., non-orthogonal configuration), communicating in accordance with the MU-MIMO configuration may result in a DMRS SNR loss, which may reduce throughput at the UEs 115. In some examples, the network entity 105-a may indicate, via the DCI message 205, a DMRS code division multiplexing (CDM) group. However, the CDM group may lack any data mapping used for other UEs of the MU-MIMO configuration. For example, the DCI message 205 may not indicate a mapping that is indicative of a DMRS rate matching that is used for each of the other UEs of the MU-MIMO configuration that enables a physical downlink shared channel (PDSCH) and DMRS to be frequency division multiplexed on the same DMRS symbols.

In some examples, the UE 115-a may refrain from performing inter-UE interference cancelation to cancel interference resulting from the other UEs 115 transmitting on other (e.g., adjacent) MIMO layers, or the UE 115-a may perform the inter-UE interference cancelation in a non-optimized way, which may result in non-optimized link adaption performance. In some examples, the UE 115-a configured for MU-MIMO communications may perform an SRS transmission, a CSI measurement, a CSI report, adaptive receive diversity (RxD) procedures, adaptive transmit diversity (TxD) procedures, or a combination thereof, in accordance with SU-MIMO parameters, which may result in non-optimized link adaption performance for MU-MIMO.

In accordance with examples described herein, the network entity 105-*a* may transmit, to the UE 115-*a*, an indication of additional information about the MU-MIMO communications. For example, the network entity 105-*a* may indicate to the UE 115-*a* parameters of the other UEs 115 (e.g., the UE 115-*b*, the UE 115-*c*, the UE 115-*d*, the UE 115-*c*, the UE 115-*f*, the UE 115-*g*, and the UE 115-*h*) that are configured for the MU-MIMO communications with the UE and that each correspond to a layer of the set of MIMO layers for the MU-MIMO communications. For example, the network entity may indicate a maximum number of layers for the MU-MIMO communications, a quantity of the other UEs 115 (e.g., that the MU-MIMO configuration includes 8 UEs 115), a spatial correlation between the UE and the other UEs, scrambling identifiers corresponding to each of the other UEs, or a combination thereof. In some examples, the network entity 105-*a* may indicate to the UE 115-*a* parameters for a subset of the other UEs 115 based on a spatial correlation between the UE 115-*a* and the other UEs 115. For example, the network entity 105-*a* may report parameters of UEs 115 within a spatial threshold of the UE 115-*a*, such as the UE 115-*b* and the UE 115-*c*. Based on the parameters received from the network entity 105-*a*, the UE 115-*a* may perform an inter-UE interference cancelation of a signal received from the network entity to reduce interference associated with the other UEs 115, which may reduce latency, reduce power utilization, and increase reliability of communications.

Figure 3:
FIG. 3 shows an example of a process flow that supports scheduling procedures for wireless communication in accordance with one or more aspects of the present disclosure.

FIG. 3 shows an example of a process flow 300 that supports scheduling procedures for wireless communication in accordance with one or more aspects of the present disclosure. The process flow 300 may implement, or may be implemented by, aspects of the wireless communications system 100 or the wireless communications system 200. For example, the process flow 300 may include a UE 115-*b* and a network entity 105-*b*, which may be examples of corresponding devices as described herein.

In the following description of the process flow 300, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 300, and other operations may be added to the process flow 300.

At 305, the UE 115-*b* may transmit a message indicating a capability of the UE 115-*b* to use an amount of transmission power different from an average transmission power during one or more portions (e.g., sub-periods, cycles) of a duration (e.g., a SAR assessment period). The average transmission power of the UE 115-*b* during the one or more portions of the duration may be based on (e.g., indicated or informed by) an average transmission power threshold (e.g., SAR requirement) over the duration. In some cases, the amount of transmission power indicated by the UE capability may indicate a positive backup power (e.g., positive difference between the average transmission power and the amount of transmission power indicated by UE capability) or a negative backup power (e.g., negative difference between the average transmission power and the amount of transmission power indicated by UE capability), as described with reference to FIG. 2. The UE 115-*b* may indicate a capability of the UE 115-*b* to support backup transmission power during an early portion, a middle portion, or a late portion of a SAR integration or evaluation period (e.g., the duration). For example, the UE 115-*b* may indicate to use an extra amount of transmission power (e.g., a value X in decibe—milliwatts of extra power) in excess of a maximum transmission power requirement (e.g., SAR requirement or threshold) of a power class of the UE 115-*b*.

At 310, the UE 115-*b* may receive, based on the message, a second message configuring the UE 115-*b* to use the amount of transmission power (e.g., indicated by UE capability) during a portion of the one or more portions (e.g., early, middle, late) of the duration. The UE 115-*b* may, for example, use the amount of transmission power indicated by the UE capability instead of using the average transmission power during the portion based on receiving the second message.

At 315, the UE 115-*b* may estimate a second amount of transmission power used over a duration associated with tracking a SAR (e.g., SAR assessment period). The second amount of transmission power may be based on the average transmission power threshold over the duration. For example, the second amount of transmission power may be less than the average transmission power threshold, indicating that backup transmission power is available at the UE 115-*b*, or may be greater than the average transmission power threshold, indicating that the UE 115-*b* is exceeding (e.g., non-compliant with) the SAR requirement for transmission power.

At 320, the UE 115-*b* may transmit a control message that indicates the second amount of transmission power. In some examples, the estimated amount of transmission power may indicate a respective amount of transmission power for each component carrier of multiple component carriers. The UE 115-*b* may be configured for uplink carrier aggregation in accordance with the multiple component carriers. The UE 115-*b* may be configured for dual connectivity of a frequency range 1 (FR1) (e.g., sub-6 GHz communications) and a frequency range 2 (FR2) (e.g., millimeter wave communications) in accordance with the multiple component carriers, where some component carriers correspond to the FR1 and other component carriers correspond to the FR2. In some examples, the estimated amount of transmission power may indicate different estimate transmission powers for the different component carriers of the carrier aggregation configuration or the dual connectivity configuration, or for the different component carriers of an uplink transmission switching configuration. The UE 115-*b* may transmit the control message via a CSI report or via MAC-control element (CE) signaling.

At 325, the network entity 105-*b* may determine to schedule the UE 115-*b* with one or more data transmissions based on traffic conditions and based on the indication from the UE 115-*b* of the second amount of transmission power. The network entity 105-*a* may determine to schedule the UE 115-*b* with data transmissions that use the backup transmission power or that refrain from using the backup transmission power.

At 330, the UE 115-*b* may receive an uplink grant that schedules the one or more data transmissions by the UE 115-*b* during the duration. One or more transmission parameters associated with the one or more data transmissions may be based on the estimated amount of transmission power (e.g., or backup transmission power). For example, the network entity 105-*a* may schedule the UE 115-*b* to increase, for the one or more data transmissions, at least one of an uplink PRB, a quantity of component carriers, a quantity of uplink MIMO layers, or a modulation and coding scheme relative to other data transmissions scheduled for the UE 115-*b* during the duration, thereby using the backup transmission power. In other examples, the network entity 105-*a* may indicate to maintain, or decrease, for at least one data transmission of the one or more data transmissions, at least one of an uplink PRB, a quantity of component carriers, a quantity of uplink MIMO layers, or a modulation and coding scheme relative to other data transmissions sched- uled for the UE 115-*b* during the duration.

In some examples, the uplink grant may indicate a first transmission power corresponding to a first subset of com- ponent carriers configured for the UE 115-*b* and a second transmission power corresponding to a second subset of component carriers configured for the UE 115-*b*. The first subset of component carriers and the second subset of component carriers may be correspond to an uplink trans- mission switching configuration at the UE 115-*b*.

Based on receiving the uplink grant, the UE 115-*b* may transmit the one or more data transmissions. In some examples, the UE 115-*b* may increase a transmit power for at least one of the one or more data transmissions, may decrease a transmit power for at least one of the one or more data transmissions, or may skip transmission of at least one of the one or more data transmissions based on the estimated amount of transmission power (e.g., or backup transmission power).

Figure 4:
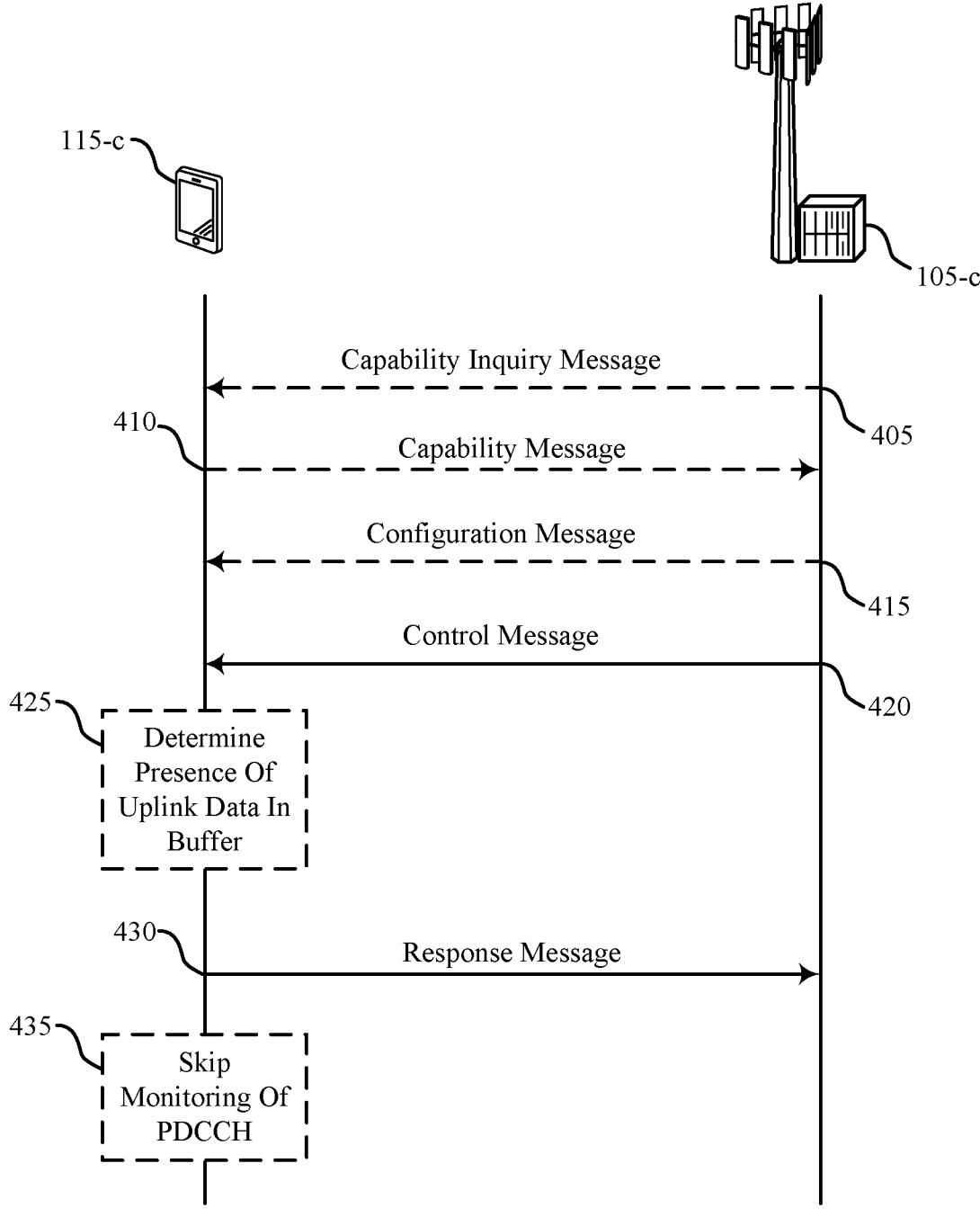
FIG. 4 shows an example of a process flow that supports scheduling procedures for wireless communication in accordance with one or more aspects of the present disclosure.

FIG. 4 shows an example of a process flow 400 that supports scheduling procedures for wireless communication in accordance with one or more aspects of the present disclosure. The process flow 400 may implement, or may be implemented by, aspects of the wireless communications system 100 or the wireless communications system 200. For example, the process flow 400 may include a UE 115-*c* and a network entity 105-*c*, which may be examples of corre- sponding devices as described herein.

In the following description of the process flow 400, the operations between the UE 115-*c* and the network entity 105-*c* may be transmitted in a different order than the example order shown, or the operations performed by the UE 115-*c* and the network entity 105-*c* may be performed in different orders or at different times. Some operations may also be omitted from the process flow 400, and other operations may be added to the process flow 400.

At 405, the network entity 105-*c* may transmit a capability inquiry message querying the UE 115-*c* of a capability to support a response message, in response to an indication from the network entity 105-*c* to skip monitoring of a PDCCH during an on-duration of a DRX cycle, that indi- cates to reject, partially accept, or accept the skipping of monitoring of the PDCCH. At 410, the UE 115-*b* may transmit a message indicating the capability of the UE 115-*c* to support the response message that indicates to reject, partially accept, or accept skipping of monitoring of the PDCCH during the on-duration of the DRX cycle.

At 415, the network entity 105-*c* may configure and enable the indication (e.g., may enable skipping PDCCH monitoring enhancement with uplink grant). At 420, the UE 115-*c* may receive a control message that includes an uplink grant and an indication to skip monitoring of a first set of resources of the PDCCH (e.g., a first set of slots) during an on-duration (e.g., active period) of the DRX cycle.

At 425, the UE 115-*c* may determine a presence of uplink data in a buffer of the UE 115-*c*. The UE 115-*c* may determine that the buffer is empty or may determine that the buffer includes uplink data. In some examples, the UE 115-*c* may predict (e.g., based on a machine learning model), a reception of uplink data to the buffer during a time period. The time period may overlap with the set of resources. In some examples, the determination by the UE 115-*c* may be based on a QoS of one or more applications.

At 430, the UE 115-*c* may transmit a response message indicating to reject, partially accept, or accept skipping of monitoring of the first set of resources of the PDCCH during the on-duration of the DRX cycle. The response message may be based on a presence of uplink data in the buffer of the UE 115-*c* (e.g., may be based on the determination at 425). In some cases, the response message may indicate to accept skipping of monitoring of the first set of resources, and the second set of resources may be the same as the first set of resources, based on the buffer being empty. For example, the response message may include an acknowl- edgement to skip monitoring of the first set of resources. In other cases, the response message may indicate to partially accept skipping of monitoring of the first set of resources, and the second set of resources may include a subset of the first set of resources, based on the prediction by the UE 115-*c* of uplink data to the buffer. For example, the UE 115-*c* may indicate to skip a first X number of time slots indicated by the first set of resources, but to refrain from skipping the remaining slots.

In still other examples, the response message may indi- cate to reject skipping of monitoring of the first set of resources, and the second set of resources may be non- overlapping with the first set of resources, based on the buffer including the uplink data. For example, the response message may include a non-acknowledgment to skip moni- toring of the first set of resources. In cases where the UE 115-*c* rejects skipping of monitoring of the first set of resources, the UE 115-*c* may transmit a buffer status report to the network entity 105-*c* or may indicate to the network entity 105-*c* a preferred timing window to skip PDCCH monitoring such that the UE 115-*c* can continue to monitor the PDCCH. The UE 115-*c* may transmit the response message via MAC-CE signaling.

At 435, the UE 115-*c* may skip monitoring of the PDCCH for the second set of resources based on the response message. For example, if the UE 115-*c* accepts skipping of monitoring of the first set of resources, the network entity 105-*c* may assume that the UE 115-*c* is skipping PDCCH monitoring with high confidence and may refrain from scheduling the UE 115-*c* on the first set of resources (e.g., during skipping time windows). In some other examples, if the UE 115-*c* rejects skipping of monitoring of the first set of resources, the network entity 105-*c* may assume that the UE 115-*c* is continuing to monitor the PDCCH and may continue to schedule the UE 115-*c* on the first set of resources.

Figure 5:
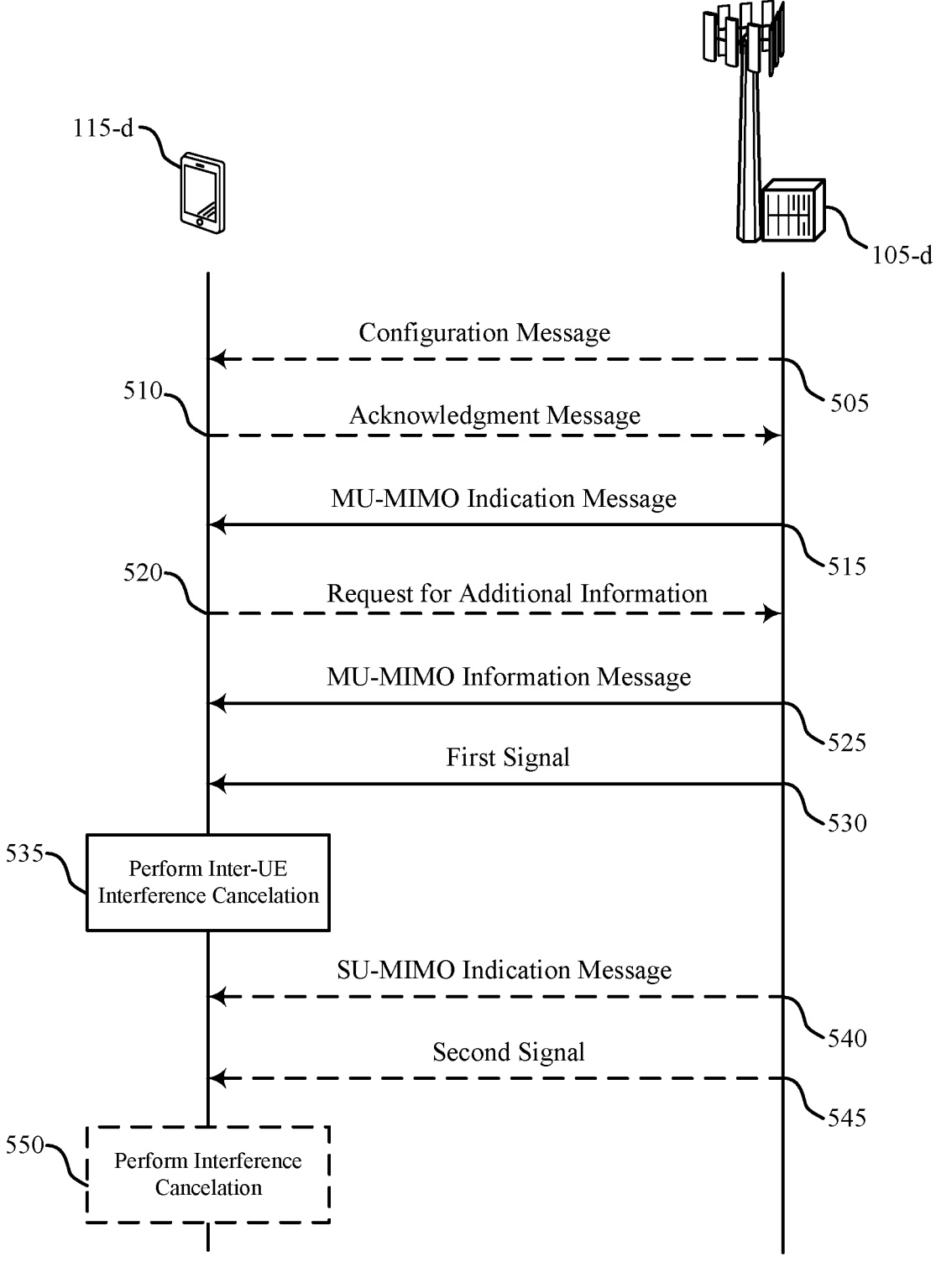
FIG. 5 shows an example of a process flow that supports scheduling procedures for wireless communication in accordance with one or more aspects of the present disclosure.

FIG. 5 shows an example of a process flow 500 that supports scheduling procedures for wireless communication in accordance with one or more aspects of the present disclosure. The process flow 500 may implement, or may be implemented by, aspects of the wireless communications system 100 or the wireless communications system 200. For example, the process flow 500 may include a UE 115-*d* and a network entity 105-*d*, which may be examples of corre- sponding devices as described herein.

In the following description of the process flow 500, the operations between the UE 115-*d* and the network entity 105-*d* may be transmitted in a different order than the example order shown, or the operations performed by the UE 115-*d* and the network entity 105-*d* may be performed in different orders or at different times. Some operations may also be omitted from the process flow 500, and other operations may be added to the process flow 500.

At 505, the network entity 105-*d* may transmit an RRC reconfiguration message that enables configurations at the UE 115-*d* of MU-MIMO communications. At 510, the UE 115-*d* may transmit a response message that indicates completion of the reconfiguration indicated by the RRC reconfiguration message. The response message may indicate a capability of the UE 115-*d* for MU-MIMO communications.

At 515, the UE 115-*d* may receive a first message indicating a configuration of MU-MIMO communications associated with the UE 115-*d* and one or more other UEs. The UE 115-*d* and the one or more other UEs may correspond to a respective layer of a set of layers (e.g., MIMO layers) for the MU-MIMO communications. The UE 115-*d* may receive the first message via MAC-CE signaling.

At 520, the UE 115-*d* may transmit a request for additional information associated with the MU-MIMO communications. For example, the UE 115-*d* may request information (e.g., assistance information) in addition to (e.g., complementary to) information indicated by the first message indicating the configuration of the MU-MIMO configuration. The UE 115-*d* may transmit the request via MAC-CE signaling.

At 525, the UE 115-*d* may receive a second message indicating one or more parameters of the one or more other UEs communicating using the MU-MIMO communications based on receiving the first message. The one or more parameters may include a maximum number of layers for the MU-MIMO communications, a quantity of the one or more other UEs, a spatial correlation between the UE 115-*d* and the one or more other UEs, a respective scrambling identifier corresponding to each UE of the subset of the one or more other UEs, or a combination thereof. The maximum number layers for the MU-MIMO communications may be less than a maximum number of layers for one or more SU-MIMO communications that are configured for the UE 115-*d*. The subset of the one or more other UEs may each satisfy a spatial threshold with relation to the UE 115-*d* (e.g., may be within a spatial distance of the UE 115-*d*).

At 530, the UE 115-*d* may receive a first signal over a layer of the set of layers for the MU-MIMO communications based on receiving the second message. The UE 115-*d* may receive a data message (e.g., via PDSCH) or a DMRS in accordance with a scrambling identifier corresponding to the UE. The scrambling identifier may differ from respective scrambling identifiers for each of the one or more other UEs.

At 535, the UE 115-*d* may process the signal to cancel interference associated with the one or more other UEs based on the one or more parameters of the one or more other UEs. The UE 115-*d* may perform interference cancelation in accordance with one or more inter-UE interference cancelation procedures. The inter-UE interference cancelation procedures may be based on (e.g., optimized for) the respective scrambling identifiers for each of the one or more other UEs (e.g., scrambling identifiers for PDSCH, physical uplink shared channel (PUSCH), DMRS ports).

At 540, the UE 115-*d* may receive a third message indicating a second configuration of SU-MIMO communications associated with the UE 115-*d*. The UE 115-*d* may correspond to a set of layers for the SU-MIMO communications.

At 545, the UE 115-*d* may receive a second signal over a layer of the set of layers for SU-MIMO communications based on receiving the third message. At 550, the UE 115-*d* may process the second signal to cancel interference associated with one or more layers of the set of layers for SU-MIMO communications different from the layer over which the second signal is received. The UE 115-*d* may perform interference cancelation in accordance with one or more interference cancelation procedures that differ from the inter-UE interference cancelation procedures based on one or more parameters.

Figure 6:
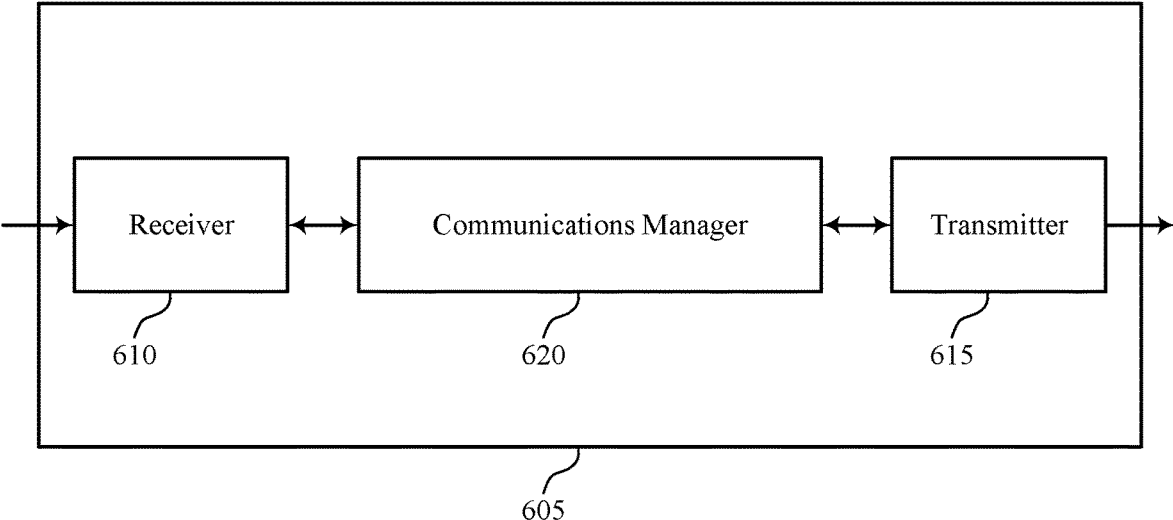
FIGS. 6 and 7 show block diagrams of devices that support scheduling procedures for wireless communication in accordance with one or more aspects of the present disclosure.

FIG. 6 shows a block diagram 600 of a device 605 that supports scheduling procedures for wireless communication in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to scheduling procedures for wireless communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to scheduling procedures for wireless communication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of scheduling procedures for wireless communication as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for estimating an amount of transmission power used over a duration associated with tracking a specific absorption rate, the amount of transmission power based on an average transmission power threshold over the duration. The communications manager 620 is capable of, configured to, or operable to support a means for transmitting a control message that indicates the estimated amount of transmission power. The communications manager 620 is capable of, configured to, or operable to support a means for receiving an uplink grant that schedules one or more data transmissions by the UE during the duration, where one or more transmission parameters associated with the one or more data transmissions is based on the estimated amount of transmission power.

Additionally, or alternatively, the communications manager 620 may support wireless communications in accordance with examples as disclosed herein. For example, the communications manager 620 is capable of, configured to, or operable to support a means for receiving a control message including an uplink grant and an indication to skip monitoring of a first set of resources of a PDCCH during an on-duration of a DRX cycle. The communications manager 620 is capable of, configured to, or operable to support a means for transmitting a response message indicating to reject, partially accept, or accept skipping of monitoring of the first set of resources of the PDCCH during the on-duration, where the response message is based on a presence of uplink data in a buffer of the UE. The communications manager 620 is capable of, configured to, or operable to support a means for skipping monitoring of the PDCCH for a second set of resources based on the response message.

Additionally, or alternatively, the communications manager 620 may support wireless communications in accordance with examples as disclosed herein. For example, the communications manager 620 is capable of, configured to, or operable to support a means for receiving a first message indicating a configuration of MU-MIMO communications associated with the UE and one or more other UEs, where the UE and the one or more other UEs correspond to a respective layer of a set of multiple layers for the MU-MIMO communications. The communications manager 620 is capable of, configured to, or operable to support a means for receiving a second message indicating one or more parameters of the one or more other UEs communicating using the MU-MIMO communications based on receiving the first message. The communications manager 620 is capable of, configured to, or operable to support a means for receiving a signal over a layer of the set of multiple layers for the MU-MIMO communications based on receiving the second message. The communications manager 620 is capable of, configured to, or operable to support a means for processing the signal to cancel interference associated with the one or more other UEs based on the one or more parameters of the one or more other UEs.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and more efficient utilization of communication resources.

Figure 7:
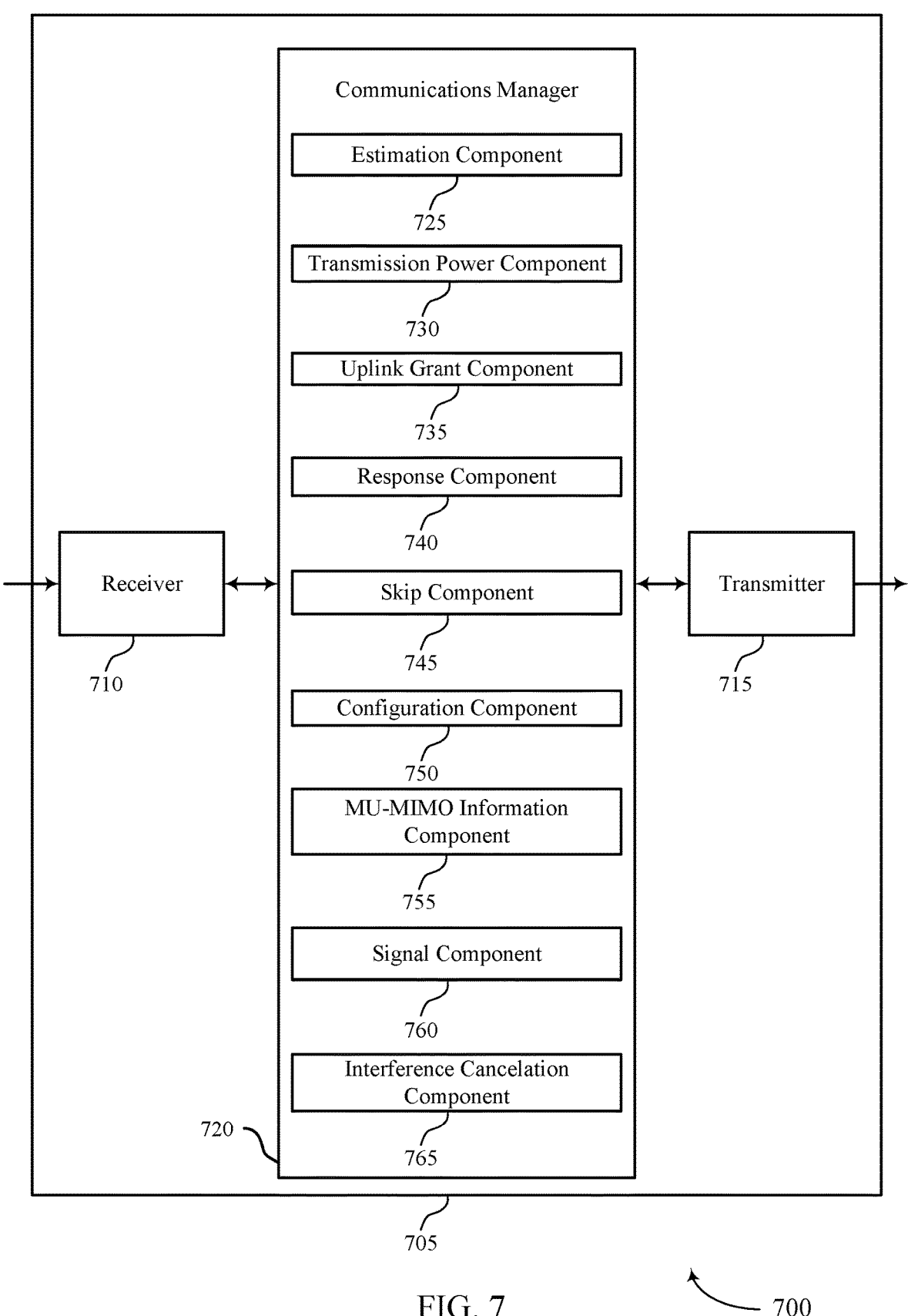

FIG. 7 shows a block diagram 700 of a device 705 that supports scheduling procedures for wireless communication in accordance with one or more aspects of the present disclosure. The device 705 may be an example of aspects of a device 605 or a UE 115 as described herein. The device 705 may include a receiver 710, a transmitter 715, and a communications manager 720. The device 705, or one of more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to scheduling procedures for wireless communication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to scheduling procedures for wireless communication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of scheduling procedures for wireless communication as described herein. For example, the communications manager 720 may include an estimation component 725, a transmission power component 730, an uplink grant component 735, a response component 740, a skip component 745, a configuration component 750, a MU-MIMO information component 755, a signal component 760, an interference cancelation component 765, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The estimation component 725 is capable of, configured to, or operable to support a means for estimating an amount of transmission power used over a duration associated with tracking a specific absorption rate, the amount of transmission power based on an average transmission power threshold over the duration. The transmission power component 730 is capable of, configured to, or operable to support a means for transmitting a control message that indicates the estimated amount of transmission power. The uplink grant component 735 is capable of, configured to, or operable to support a means for receiving an uplink grant that schedules one or more data transmissions by the UE during the duration, where one or more transmission parameters associated with the one or more data transmissions is based on the estimated amount of transmission power.

Additionally, or alternatively, the communications manager 720 may support wireless communications in accordance with examples as disclosed herein. The uplink grant component 735 is capable of, configured to, or operable to support a means for receiving a control message including an uplink grant and an indication to skip monitoring of a first set of resources of a PDCCH during an on-duration of a DRX cycle. The response component 740 is capable of, configured to, or operable to support a means for transmitting a response message indicating to reject, partially accept, or accept skipping of monitoring of the first set of resources of the PDCCH during the on-duration, where the response message is based on a presence of uplink data in a buffer of the UE. The skip component 745 is capable of, configured to, or operable to support a means for skipping monitoring of the PDCCH for a second set of resources based on the response message.

Additionally, or alternatively, the communications manager 720 may support wireless communications in accordance with examples as disclosed herein. The configuration component 750 is capable of, configured to, or operable to support a means for receiving a first message indicating a configuration of MU-MIMO communications associated with the UE and one or more other UEs, where the UE and the one or more other UEs correspond to a respective layer of a set of multiple layers for the MU-MIMO communications. The MU-MIMO information component 755 is capable of, configured to, or operable to support a means for receiving a second message indicating one or more parameters of the one or more other UEs communicating using the MU-MIMO communications based on receiving the first message. The signal component 760 is capable of, configured to, or operable to support a means for receiving a signal over a layer of the set of multiple layers for the MU-MIMO communications based on receiving the second message. The interference cancelation component 765 is capable of, configured to, or operable to support a means for processing the signal to cancel interference associated with the one or more other UEs based on the one or more parameters of the one or more other UEs.

Figure 8:
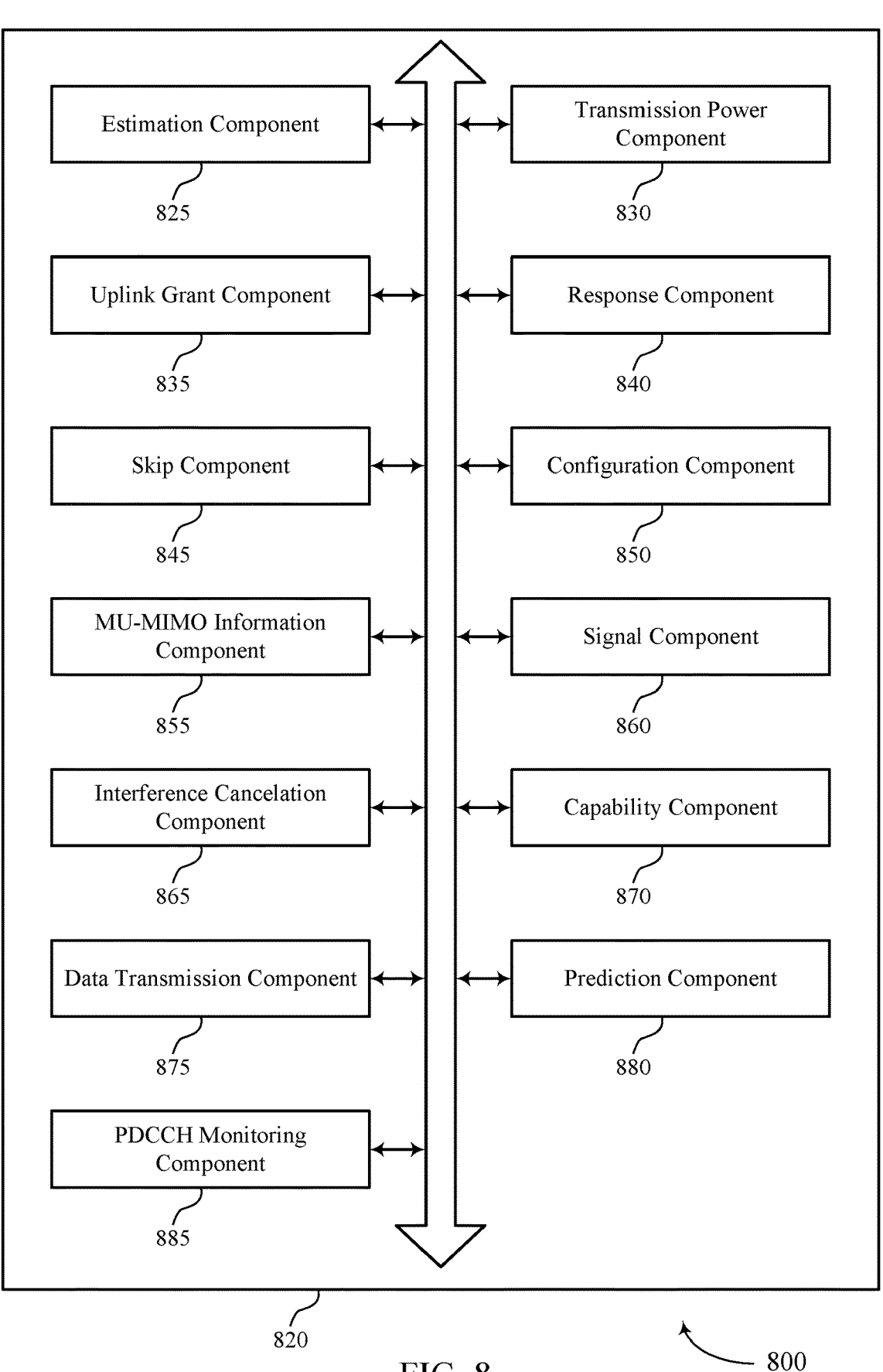
FIG. 8 shows a block diagram of a communications manager that supports scheduling procedures for wireless communication in accordance with one or more aspects of the present disclosure.

FIG. 8 shows a block diagram 800 of a communications manager 820 that supports scheduling procedures for wireless communication in accordance with one or more aspects of the present disclosure. The communications manager 820 may be an example of aspects of a communications manager 620, a communications manager 720, or both, as described herein. The communications manager 820, or various components thereof, may be an example of means for performing various aspects of scheduling procedures for wireless communication as described herein. For example, the communications manager 820 may include an estimation component 825, a transmission power component 830, an uplink grant component 835, a response component 840, a skip component 845, a configuration component 850, a MU-MIMO information component 855, a signal component 860, an interference cancelation component 865, a capability component 870, a data transmission component 875, a prediction component 880, a PDCCH monitoring component 885, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The estimation component 825 is capable of, configured to, or operable to support a means for estimating an amount of transmission power used over a duration associated with tracking a specific absorption rate, the amount of transmission power based on an average transmission power threshold over the duration. The transmission power component 830 is capable of, configured to, or operable to support a means for transmitting a control message that indicates the estimated amount of transmission power. The uplink grant component 835 is capable of, configured to, or operable to support a means for receiving an uplink grant that schedules one or more data transmissions by the UE during the duration, where one or more transmission parameters associated with the one or more data transmissions is based on the estimated amount of transmission power.

In some examples, the capability component 870 is capable of, configured to, or operable to support a means for transmitting a message indicating a capability of the UE to use a second amount of transmission power different from an average transmission power during one or more portions of the duration.

In some examples, the transmission power component 830 is capable of, configured to, or operable to support a means for receiving, based on the message, a second message configuring the UE to use the second amount of transmission power during a portion of the one or more portions of the duration.

In some examples, the data transmission component 875 is capable of, configured to, or operable to support a means for skipping at least one data transmission of the one or more data transmissions based on the one or more transmission parameters satisfying a threshold associated with the duration.

In some examples, the data transmission component 875 is capable of, configured to, or operable to support a means for decreasing a transmission power of at least one data transmission of the one or more data transmissions based on the estimated amount of transmission power satisfying a threshold.

In some examples, the estimated amount of transmission power indicates a respective estimated amount of transmission power for each component carrier of a set of multiple component carriers associated with the one or more data transmissions.

In some examples, the uplink grant indicates a first transmission power corresponding to a first subset of component carriers of the set of multiple component carriers and a second transmission power corresponding to a second subset of component carriers of the set of multiple component carriers based on the respective amount of transmission power for each component carrier.

In some examples, the UE is configured to transmit the one or more data transmissions via the first subset of component carriers during a first portion of the duration and transmit the one or more data transmissions via the second subset of component carriers during a second portion of the duration in accordance with an uplink transmission switching configuration.

In some examples, to support receiving the uplink grant, the uplink grant component 835 is capable of, configured to, or operable to support a means for receiving an indication to increase a value associated with at least one transmission parameter of the one or more transmission parameters based on the estimated amount of transmission power.

In some examples, the one or more transmission parameters include a physical resource block, a component carrier, a quantity of layers, a modulation and coding scheme, or a combination thereof.

Additionally, or alternatively, the communications manager 820 may support wireless communications in accordance with examples as disclosed herein. In some examples, the uplink grant component 835 is capable of, configured to, or operable to support a means for receiving a control message including an uplink grant and an indication to skip monitoring of a first set of resources of a PDCCH during an on-duration of a DRX cycle. The response component 840 is capable of, configured to, or operable to support a means for transmitting a response message indicating to reject, partially accept, or accept skipping of monitoring of the first set of resources of the PDCCH during the on-duration, where the response message is based on a presence of uplink data in a buffer of the UE. The skip component 845 is capable of, configured to, or operable to support a means for skipping monitoring of the PDCCH for a second set of resources based on the response message.

In some examples, the capability component 870 is capable of, configured to, or operable to support a means for transmitting a message indicating a capability of the UE to support the response message that indicates to reject, partially accept, or accept skipping of monitoring of the first set of resources of the PDCCH during the on-duration.

In some examples, the response component 840 is capable of, configured to, or operable to support a means for determining that the buffer of the UE is empty, where the response message indicates to accept skipping of monitoring of the first set of resources, and where the second set of resources is the same as the first set of resources based on the buffer being empty.

In some examples, the prediction component 880 is capable of, configured to, or operable to support a means for predicting a reception of uplink data to the buffer during a time period, the time period overlapping with the first set of resources.

In some examples, the response message indicates to partially accept the skipping of monitoring of the first set of resources. In some examples, the second set of resources includes a subset of the first set of resources based on the prediction.

In some examples, predicting the reception of the uplink data to the buffer is based on a machine learning model.

In some examples, the response component 840 is capable of, configured to, or operable to support a means for determining that the buffer of the UE includes uplink data, where the response message indicates to reject skipping of monitoring of the first set of resources, and where the second set of resources is non-overlapping with the first set of resources based on the buffer including the uplink data.

In some examples, the PDCCH monitoring component 885 is capable of, configured to, or operable to support a means for monitoring the first set of resources of the PDCCH based on the response message indicating to reject skipping of monitoring of the first set of resources.

In some examples, to support transmitting the response message, the response component 840 is capable of, configured to, or operable to support a means for transmitting the response message via a MAC-CE.

Additionally, or alternatively, the communications manager 820 may support wireless communications in accordance with examples as disclosed herein. The configuration component 850 is capable of, configured to, or operable to support a means for receiving a first message indicating a configuration of MU-MIMO communications associated with the UE and one or more other UEs, where the UE and the one or more other UEs correspond to a respective layer of a set of multiple layers for the MU-MIMO communications. The MU-MIMO information component 855 is capable of, configured to, or operable to support a means for receiving a second message indicating one or more parameters of the one or more other UEs communicating using the MU-MIMO communications based on receiving the first message. The signal component 860 is capable of, configured to, or operable to support a means for receiving a signal over a layer of the set of multiple layers for the MU-MIMO communications based on receiving the second message. The interference cancelation component 865 is capable of, configured to, or operable to support a means for processing the signal to cancel interference associated with the one or more other UEs based on the one or more parameters of the one or more other UEs.

In some examples, the MU-MIMO information component 855 is capable of, configured to, or operable to support a means for transmitting a request for additional information associated with the MU-MIMO communications, where the second message is received in response to transmitting the request.

In some examples, the one or more parameters include a maximum number of layers for the MU-MIMO communications, a quantity of the one or more other UEs, or both.

In some examples, the one or more parameters include a spatial correlation between the UE and a subset of the one or more other UEs, a respective scrambling identifier corresponding to each UE of the subset of the one or more other UEs, or both.

In some examples, to support receiving the signal, the signal component 860 is capable of, configured to, or operable to support a means for receiving at least one of a data message or a demodulation reference signal in accordance with a scrambling identifier corresponding to the UE.

In some examples, receiving the second message is based on a spatial separation between the UE and at least one UE of the one or more other UEs satisfying a threshold.

In some examples, the configuration component 850 is capable of, configured to, or operable to support a means for receiving a third message indicating a second configuration of single-user, multiple input, multiple output (SU-MIMO) communications associated with the UE, where the UE corresponds to a second set of multiple layers for the SU-MIMO communications. In some examples, the signal component 860 is capable of, configured to, or operable to support a means for receiving a second signal over a second layer of the second set of multiple layers for the SU-MIMO communications based on receiving the third message. In some examples, the interference cancelation component 865 is capable of, configured to, or operable to support a means for processing the second signal to cancel second interference associated with one or more layers of the second set of multiple layers different from the second layer.

In some examples, the second set of multiple layers is greater than the first set of multiple layers.

In some examples, the set of multiple layers for the MU-MIMO communications correspond to a same time slot of a physical resource block.

Figure 9:
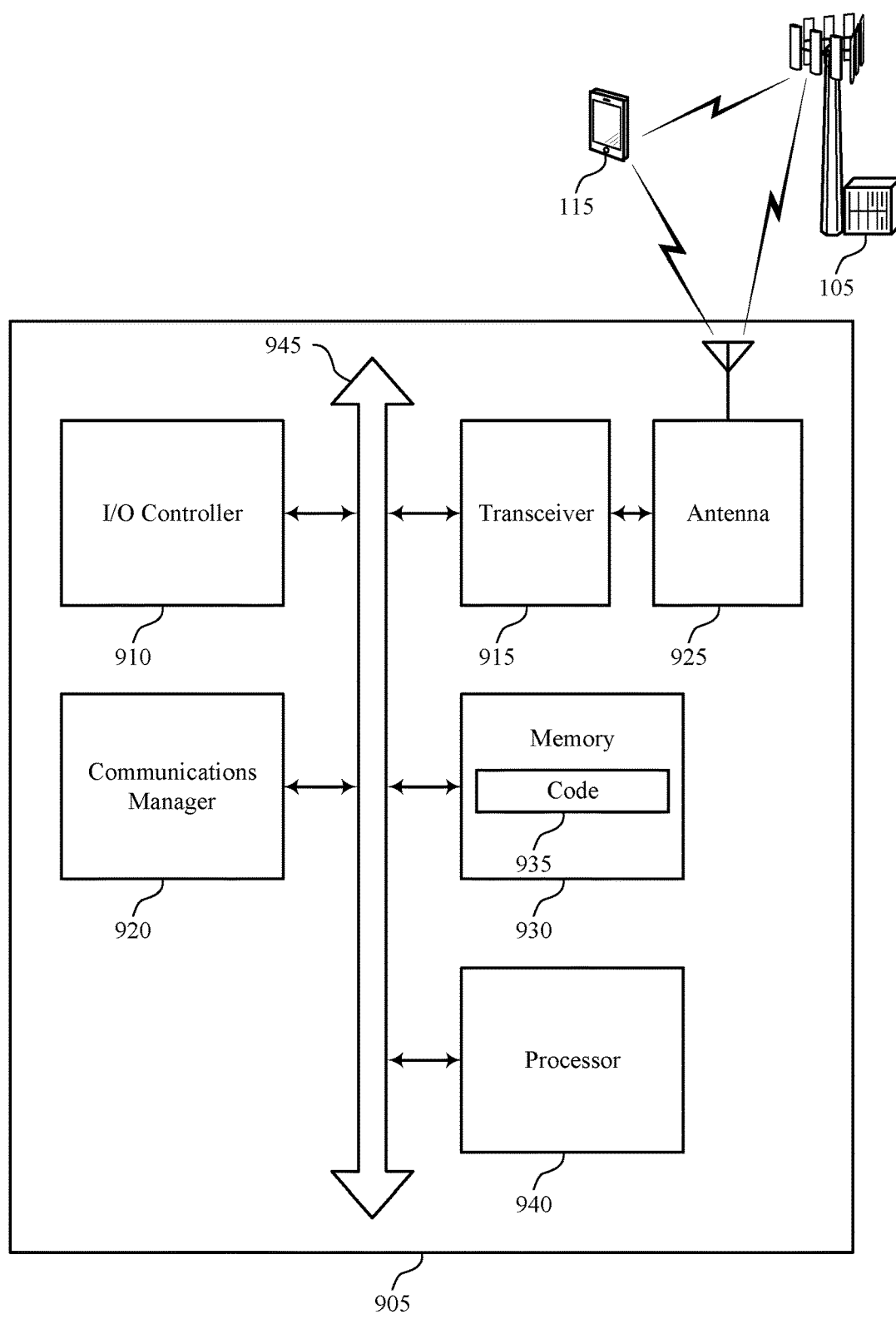
FIG. 9 shows a diagram of a system including a device that supports scheduling procedures for wireless communication in accordance with one or more aspects of the present disclosure.

FIG. 9 shows a diagram of a system 900 including a device 905 that supports scheduling procedures for wireless communication in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting scheduling procedures for wireless communication). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for estimating an amount of transmission power used over a duration associated with tracking a specific absorption rate, the amount of transmission power based on an average transmission power threshold over the duration. The communications manager 920 is capable of, configured to, or operable to support a means for transmitting a control message that indicates the estimated amount of transmission power. The communications manager 920 is capable of, configured to, or operable to support a means for receiving an uplink grant that schedules one or more data transmissions by the UE during the duration, where one or more transmission parameters associated with the one or more data transmissions is based on the estimated amount of transmission power.

Additionally, or alternatively, the communications manager 920 may support wireless communications in accordance with examples as disclosed herein. For example, the communications manager 920 is capable of, configured to, or operable to support a means for receiving a control message including an uplink grant and an indication to skip monitoring of a first set of resources of a PDCCH during an on-duration of a DRX cycle. The communications manager 920 is capable of, configured to, or operable to support a means for transmitting a response message indicating to reject, partially accept, or accept skipping of monitoring of the first set of resources of the PDCCH during the on-duration, where the response message is based on a presence of uplink data in a buffer of the UE. The communications manager 920 is capable of, configured to, or operable to support a means for skipping monitoring of the PDCCH for a second set of resources based on the response message.

Additionally, or alternatively, the communications manager 920 may support wireless communications in accordance with examples as disclosed herein. For example, the communications manager 920 is capable of, configured to, or operable to support a means for receiving a first message indicating a configuration of MU-MIMO communications associated with the UE and one or more other UEs, where the UE and the one or more other UEs correspond to a respective layer of a set of multiple layers for the MU-MIMO communications. The communications manager 920 is capable of, configured to, or operable to support a means for receiving a second message indicating one or more parameters of the one or more other UEs communicating using the MU-MIMO communications based on receiving the first message. The communications manager 920 is capable of, configured to, or operable to support a means for receiving a signal over a layer of the set of multiple layers for the MU-MIMO communications based on receiving the second message. The communications manager 920 is capable of, configured to, or operable to support a means for processing the signal to cancel interference associated with the one or more other UEs based on the one or more parameters of the one or more other UEs.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of scheduling procedures for wireless communication as described herein, or the at least one processor 940 and the at least one memory 930 may be otherwise configured to, individually or collectively, perform or support such operations.

FIG. 10 shows a flowchart illustrating a method 1000 that supports scheduling procedures for wireless communication in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include estimating an amount of transmission power used over a duration associated with tracking a specific absorption rate, the amount of transmission power based on an average transmission power threshold over the duration. The operations of block 1005 may be performed in accordance with examples as disclosed herein. In some examples, aspects of the operations of 1005 may be performed by an estimation component 825 as described with reference to FIG. 8.

At 1010, the method may include transmitting a control message that indicates the estimated amount of transmission power. The operations of block 1010 may be performed in accordance with examples as disclosed herein. In some examples, aspects of the operations of 1010 may be performed by a transmission power component 830 as described with reference to FIG. 8.

At 1015, the method may include receiving an uplink grant that schedules one or more data transmissions by the UE during the duration, where one or more transmission parameters associated with the one or more data transmissions is based on the estimated amount of transmission power. The operations of block 1015 may be performed in accordance with examples as disclosed herein. In some examples, aspects of the operations of 1015 may be performed by an uplink grant component 835 as described with reference to FIG. 8.

FIG. 11 shows a flowchart illustrating a method 1100 that supports scheduling procedures for wireless communication in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include transmitting a message indicating a capability of the UE to use a second amount of transmission power different from an average transmission power during one or more portions of the duration. The operations of block 1105 may be performed in accordance with examples as disclosed herein. In some examples, aspects of the operations of 1105 may be performed by a capability component 870 as described with reference to FIG. 8.

At 1110, the method may include estimating an amount of transmission power used over a duration associated with tracking a specific absorption rate, the amount of transmission power based on an average transmission power threshold over the duration. The operations of block 1110 may be performed in accordance with examples as disclosed herein. In some examples, aspects of the operations of 1110 may be performed by an estimation component 825 as described with reference to FIG. 8.

At 1115, the method may include transmitting a control message that indicates the estimated amount of transmission power. The operations of block 1115 may be performed in accordance with examples as disclosed herein. In some examples, aspects of the operations of 1115 may be performed by a transmission power component 830 as described with reference to FIG. 8.

At 1120, the method may include receiving an uplink grant that schedules one or more data transmissions by the UE during the duration, where one or more transmission parameters associated with the one or more data transmissions is based on the estimated amount of transmission power. The operations of block 1120 may be performed in accordance with examples as disclosed herein. In some examples, aspects of the operations of 1120 may be performed by an uplink grant component 835 as described with reference to FIG. 8.

FIG. 12 shows a flowchart illustrating a method 1200 that supports scheduling procedures for wireless communication in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving a control message including an uplink grant and an indication to skip monitoring of a first set of resources of a PDCCH during an on-duration of a DRX cycle. The operations of block 1205 may be performed in accordance with examples as disclosed herein. In some examples, aspects of the operations of 1205 may be performed by an uplink grant component 835 as described with reference to FIG. 8.

At 1210, the method may include transmitting a response message indicating to reject, partially accept, or accept skipping of monitoring of the first set of resources of the PDCCH during the on-duration, where the response message is based on a presence of uplink data in a buffer of the UE. The operations of block 1210 may be performed in accordance with examples as disclosed herein. In some examples, aspects of the operations of 1210 may be performed by a response component 840 as described with reference to FIG. 8.

At 1215, the method may include skipping monitoring of the PDCCH for a second set of resources based on the response message. The operations of block 1215 may be performed in accordance with examples as disclosed herein. In some examples, aspects of the operations of 1215 may be performed by a skip component 845 as described with reference to FIG. 8.

FIG. 13 shows a flowchart illustrating a method 1300 that supports scheduling procedures for wireless communication in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include transmitting a message indicating a capability of the UE to support a response message that indicates to reject, partially accept, or accept skipping monitoring of a first set of resources of a PDCCH during an on-duration of a DRX cycle. The operations of block 1305 may be performed in accordance with examples as disclosed herein. In some examples, aspects of the operations of 1305 may be performed by a capability component 870 as described with reference to FIG. 8.

At 1310, the method may include receiving a control message including an uplink grant and an indication to skip monitoring of the first set of resources of the PDCCH during the on-duration of the DRX cycle. The operations of block 1310 may be performed in accordance with examples as disclosed herein. In some examples, aspects of the operations of 1310 may be performed by an uplink grant component 835 as described with reference to FIG. 8.

At 1315, the method may include transmitting a response message indicating to reject, partially accept, or reject skipping of monitoring of the set of resources of the PDCCH during the on-duration, where the response message is based on a presence of uplink data in a buffer of the UE. The operations of block 1315 may be performed in accordance with examples as disclosed herein. In some examples, aspects of the operations of 1315 may be performed by a response component 840 as described with reference to FIG. 8.

At 1320, the method may include skipping monitoring of the PDCCH for a second set of resources based on the response message. The operations of block 1320 may be performed in accordance with examples as disclosed herein. In some examples, aspects of the operations of 1320 may be performed by a skip component 845 as described with reference to FIG. 8.

FIG. 14 shows a flowchart illustrating a method 1400 that supports scheduling procedures for wireless communication in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first message indicating a configuration of MU-MIMO communications associated with the UE and one or more other UEs, where the UE and the one or more other UEs correspond to a respective layer of a set of multiple layers for the MU-MIMO communications. The operations of block 1405 may be performed in accordance with examples as disclosed herein. In some examples, aspects of the operations of 1405 may be performed by a configuration component 850 as described with reference to FIG. 8.

At 1410, the method may include receiving a second message indicating one or more parameters of the one or more other UEs communicating using the MU-MIMO communications based on receiving the first message. The operations of block 1410 may be performed in accordance with examples as disclosed herein. In some examples, aspects of the operations of 1410 may be performed by a MU-MIMO information component 855 as described with reference to FIG. 8.

At 1415, the method may include receiving a signal over a layer of the set of multiple layers for the MU-MIMO communications based on receiving the second message. The operations of block 1415 may be performed in accordance with examples as disclosed herein. In some examples, aspects of the operations of 1415 may be performed by a signal component 860 as described with reference to FIG. 8.

At 1420, the method may include processing the signal to cancel interference associated with the one or more other UEs based on the one or more parameters of the one or more other UEs. The operations of block 1420 may be performed in accordance with examples as disclosed herein. In some examples, aspects of the operations of 1420 may be performed by an interference cancelation component 865 as described with reference to FIG. 8.

FIG. 15 shows a flowchart illustrating a method 1500 that supports scheduling procedures for wireless communication in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first message indicating a configuration of MU-MIMO communications associated with the UE and one or more other UEs, where the UE and the one or more other UEs correspond to a respective layer of a set of multiple layers for the MU-MIMO communications. The operations of block 1505 may be performed in accordance with examples as disclosed herein. In some examples, aspects of the operations of 1505 may be performed by a configuration component 850 as described with reference to FIG. 8.

At 1510, the method may include transmitting a request for additional information associated with the MU-MIMO communications. The operations of block 1510 may be performed in accordance with examples as disclosed herein. In some examples, aspects of the operations of 1510 may be performed by a MU-MIMO information component 855 as described with reference to FIG. 8.

At 1515, the method may include receiving a second message indicating one or more parameters of the one or more other UEs communicating using the MU-MIMO communications based on receiving the first message, where the second message is received in response to transmitting the request. The operations of block 1515 may be performed in accordance with examples as disclosed herein. In some examples, aspects of the operations of 1515 may be performed by a MU-MIMO information component 855 as described with reference to FIG. 8.

At 1520, the method may include receiving a signal over a layer of the set of multiple layers for the MU-MIMO communications based on receiving the second message. The operations of block 1520 may be performed in accordance with examples as disclosed herein. In some examples, aspects of the operations of 1520 may be performed by a signal component 860 as described with reference to FIG. 8.

At 1525, the method may include processing the signal to cancel interference associated with the one or more other UEs based on the one or more parameters of the one or more other UEs. The operations of block 1525 may be performed in accordance with examples as disclosed herein. In some examples, aspects of the operations of 1525 may be performed by an interference cancelation component 865 as described with reference to FIG. 8.

The following provides an overview of aspects of the present disclosure:

Aspect 1: A method for wireless communications by a UE, comprising: estimating an amount of transmission power used over a duration associated with tracking a SAR, the amount of transmission power based at least in part on an average transmission power threshold over the duration; transmitting a control message that indicates the estimated amount of transmission power; and receiving an uplink grant that schedules one or more data transmissions by the UE during the duration, wherein one or more transmission parameters associated with the one or more data transmissions is based at least in part on the estimated amount of transmission power.

Aspect 2: The method of aspect 1, further comprising: transmitting a message indicating a capability of the UE to use a second amount of transmission power different from an average transmission power during one or more portions of the duration.

Aspect 3: The method of aspect 2, further comprising: receiving, based at least in part on the message, a second message configuring the UE to use the second amount of transmission power during a portion of the one or more portions of the duration.

Aspect 4: The method of any of aspects 1 through 3, further comprising: skipping at least one data transmission of the one or more data transmissions based at least in part on the one or more transmission parameters satisfying a threshold associated with the duration.

Aspect 5: The method of any of aspects 1 through 4, further comprising: decreasing a transmission power of at least one data transmission of the one or more data transmissions based at least in part on the estimated amount of transmission power satisfying a threshold.

Aspect 6: The method of any of aspects 1 through 5, wherein the estimated amount of transmission power indicates a respective estimated amount of transmission power for each component carrier of a plurality of component carriers associated with the one or more data transmissions.

Aspect 7: The method of aspect 6, wherein the uplink grant indicates a first transmission power corresponding to a first subset of component carriers of the plurality of component carriers and a second transmission power corresponding to a second subset of component carriers of the plurality of component carriers based at least in part on the respective amount of transmission power for each component carrier.

Aspect 8: The method of aspect 7, wherein the UE is configured to transmit the one or more data transmissions via the first subset of component carriers during a first portion of the duration and transmit the one or more data transmissions via the second subset of component carriers during a second portion of the duration in accordance with an uplink transmission switching configuration.

Aspect 9: The method of any of aspects 1 through 8, wherein receiving the uplink grant comprises: receiving an indication to increase a value associated with at least one transmission parameter of the one or more transmission parameters based at least in part on the estimated amount of transmission power.

Aspect 10: The method of any of aspects 1 through 9, wherein the one or more transmission parameters comprise a physical resource block, a component carrier, a quantity of layers, a modulation and coding scheme, or a combination thereof.

Aspect 11: A method for wireless communications by a UE, comprising: receiving a control message comprising an uplink grant and an indication to skip monitoring of a first set of resources of a PDCCH during an on-duration of a discontinuous reception cycle; transmitting a response message indicating to reject, partially accept, or accept skipping of monitoring of the first set of resources of the PDCCH during the on-duration, wherein the response message is based at least in part on a presence of uplink data in a buffer of the UE; skipping monitoring of the PDCCH for a second set of resources based at least in part on the response message.

Aspect 12: The method of aspect 11, further comprising: transmitting a message indicating a capability of the UE to support the response message that indicates to reject, partially accept, or accept skipping of monitoring of the first set of resources of the PDCCH during the on-duration.

Aspect 13: The method of any of aspects 11 through 12, further comprising: determining that the buffer of the UE is empty, wherein the response message indicates to accept skipping of monitoring of the first set of resources, and wherein the second set of resources is the same as the first set of resources based at least in part on the buffer being empty.

Aspect 14: The method of any of aspects 11 through 12, further comprising: predicting a reception of uplink data to the buffer during a time period, the time period overlapping with the first set of resources.

Aspect 15: The method of aspect 14, wherein the response message indicates to partially accept skipping of monitoring of the first set of resources, and the second set of resources comprises a subset of the first set of resources based at least in part on the prediction.

Aspect 16: The method of any of aspects 14 through 15, wherein predicting the reception of the uplink data to the buffer is based at least in part on a machine learning model.

Aspect 17: The method of any of aspects 11 through 12, further comprising: determining that the buffer of the UE comprises uplink data, wherein the response message indicates to reject skipping of monitoring of the first set of resources, and wherein the second set of resources is non-overlapping with the first set of resources based at least in part on the buffer comprising the uplink data.

Aspect 18: The method of aspect 17, further comprising: monitoring the first set of resources of the PDCCH based at least in part on the response message indicating to reject skipping of monitoring of the first set of resources.

Aspect 19: The method of any of aspects 11 through 18, wherein transmitting the response message comprises: transmitting the response message via a MAC-CE.

Aspect 20: A method for wireless communications by a UE, comprising: receiving a first message indicating a configuration of MU-MIMO communications associated with the UE and one or more other UEs, wherein the UE and the one or more other UEs correspond to a respective layer of a plurality of layers for the MU-MIMO communications; receiving a second message indicating one or more parameters of the one or more other UEs communicating using the MU-MIMO communications based at least in part on receiving the first message; receiving a signal over a layer of the plurality of layers for the MU-MIMO communications based at least in part on receiving the second message; and processing the signal to cancel interference associated with the one or more other UEs based at least in part on the one or more parameters of the one or more other UEs.

Aspect 21: The method of aspect 20, further comprising: transmitting a request for additional information associated with the MU-MIMO communications, wherein the second message is received in response to transmitting the request.

Aspect 22: The method of any of aspects 20 through 21, wherein the one or more parameters comprise a maximum number of layers for the MU-MIMO communications, a quantity of the one or more other UEs, or both.

Aspect 23: The method of any of aspects 20 through 22, wherein the one or more parameters comprise a spatial correlation between the UE and a subset of the one or more other UEs, a respective scrambling identifier corresponding to each UE of the subset of the one or more other UEs, or both.

Aspect 24: The method of aspect 23, wherein receiving the second message is based at least in part on a spatial separation between the UE and at least one UE of the one or more other UEs satisfying a threshold.

Aspect 25: The method of any of aspects 20 through 24, wherein receiving the signal comprises: receiving at least one of a data message or a demodulation reference signal in accordance with a scrambling identifier corresponding to the UE.

Aspect 26: The method of any of aspects 20 through 25, further comprising: receiving a third message indicating a second configuration of SU-MIMO communications associated with the UE, wherein the UE corresponds to a second plurality of layers for the SU-MIMO communications; receiving a second signal over a second layer of the second plurality of layers for the SU-MIMO communications based at least in part on receiving the third message; and processing the second signal to cancel second interference associated with one or more layers of the second plurality of layers different from the second layer.

Aspect 27: The method of aspect 26, wherein the second plurality of layers is greater than the first plurality of layers.

Aspect 28: The method of any of aspects 20 through 27, wherein the plurality of layers for the MU-MIMO communications correspond to a same time slot of a physical resource block.

Aspect 29: A UE for wireless communications, comprising one or more memories storing processor-executable code, and one or more processors coupled with the one or more memories and individually or collectively operable to execute the code to cause the UE to perform a method of any of aspects 1 through 10.

Aspect 30: A UE for wireless communications, comprising at least one means for performing a method of any of aspects 1 through 10.

Aspect 31: A non-transitory computer-readable medium storing code for wireless communications, the code comprising instructions executable by one or more processors to perform a method of any of aspects 1 through 10.

Aspect 32: A UE for wireless communications, comprising one or more memories storing processor-executable code, and one or more processors coupled with the one or more memories and individually or collectively operable to execute the code to cause the UE to perform a method of any of aspects 11 through 19.

Aspect 33: A UE for wireless communications, comprising at least one means for performing a method of any of aspects 11 through 19.

Aspect 34: A non-transitory computer-readable medium storing code for wireless communications, the code comprising instructions executable by one or more processors to perform a method of any of aspects 11 through 19.

Aspect 35: A UE for wireless communications, comprising one or more memories storing processor-executable code, and one or more processors coupled with the one or more memories and individually or collectively operable to execute the code to cause the UE to perform a method of any of aspects 20 through 28.

Aspect 36: A UE for wireless communications, comprising at least one means for performing a method of any of aspects 20 through 28.

Aspect 37: A non-transitory computer-readable medium storing code for wireless communications, the code comprising instructions executable by one or more processors to perform a method of any of aspects 20 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising: one or more memories storing processor-executable code; and one or more processors coupled with the one or more memories and individually or collectively operable to execute the code to cause the UE to:

estimate an amount of transmission power used over a duration associated with tracking a specific absorption rate, the amount of transmission power based at least in part on an average transmission power threshold over the duration;

transmit a control message that indicates the estimated amount of transmission power; and receive an uplink grant that schedules one or more data transmissions by the UE during the duration, wherein one or more transmission parameters associated with the one or more data transmissions is based at least in part on the estimated amount of transmission power.

2. The UE of claim 1, wherein the one or more processors are individually or collectively further operable to execute the code to cause the UE to: transmit a message indicating a capability of the UE to use a second amount of transmission power different from an average transmission power during one or more portions of the duration.

3. The UE of claim 2, wherein the one or more processors are individually or collectively further operable to execute the code to cause the UE to: receive, based at least in part on the message, a second message configuring the UE to use the second amount of transmission power during a portion of the one or more portions of the duration.

4. The UE of claim 1, wherein the one or more processors are individually or collectively further operable to execute the code to cause the UE to: skip at least one data transmission of the one or more data transmissions based at least in part on the one or more transmission parameters satisfying a threshold associated with the duration.

5. The UE of claim 1, wherein the one or more processors are individually or collectively further operable to execute the code to cause the UE to: decrease a transmission power of at least one data transmission of the one or more data transmissions based at least in part on the estimated amount of transmission power satisfying a threshold.

6. The UE of claim 1, wherein the estimated amount of transmission power indicates a respective estimated amount of transmission power for each component carrier of a plurality of component carriers associated with the one or more data transmissions.

7. The UE of claim 6, wherein the uplink grant indicates a first transmission power corresponding to a first subset of component carriers of the plurality of component carriers and a second transmission power corresponding to a second subset of component carriers of the plurality of component carriers based at least in part on the respective amount of transmission power for each component carrier.

8. The UE of claim 7, wherein the UE is configured to transmit the one or more data transmissions via the first subset of component carriers during a first portion of the duration and transmit the one or more data transmissions via the second subset of component carriers during a second portion of the duration in accordance with an uplink transmission switching configuration.

9. The UE of claim 1, wherein, to receive the uplink grant, the one or more processors are individually or collectively operable to execute the code to cause the UE to: receive an indication to increase a value associated with at least one transmission parameter of the one or more transmission parameters based at least in part on the estimated amount of transmission power.

10. The UE of claim 1, wherein the one or more transmission parameters comprise a physical resource block, a component carrier, a quantity of layers, a modulation and coding scheme, or a combination thereof.

\* \* \* \* \*